US012468790B2

(12) United States Patent
Sugimoto

(10) Patent No.: US 12,468,790 B2
(45) Date of Patent: Nov. 11, 2025

(54) TIME/DATE ADJUSTMENT APPARATUS, TIME/DATE ADJUSTMENT METHOD, AND NON-TRANSITORY COMPUTER-READABLE STORAGE MEDIUM THEREFOR

(71) Applicant: E4 Inc., Tokyo (JP)

(72) Inventor: Taichiro Sugimoto, Tokyo (JP)

(73) Assignee: E4 Inc., Tokyo (JP)

( * ) Notice: Subject to any disclaimer, the term of this patent is extended or adjusted under 35 U.S.C. 154(b) by 236 days.

(21) Appl. No.: 18/551,389

(22) PCT Filed: Feb. 22, 2022

(86) PCT No.: PCT/JP2022/007297
§ 371 (c)(1),
(2) Date: Sep. 19, 2023

(87) PCT Pub. No.: WO2022/202062
PCT Pub. Date: Sep. 29, 2022

(65) Prior Publication Data
US 2024/0169038 A1    May 23, 2024

(30) Foreign Application Priority Data
Mar. 21, 2021  (JP) ................ 2021-046719

(51) Int. Cl.
G06F 21/31  (2013.01)
(52) U.S. Cl.
CPC .................... G06F 21/31 (2013.01)
(58) Field of Classification Search
None
See application file for complete search history.

(56) References Cited

U.S. PATENT DOCUMENTS 9,679,274 B1 *  6/2017  Roth .................. G06Q 10/1095
9,978,043 B2 *  5/2018  Jon ....................... G06F 3/0481
(Continued)

FOREIGN PATENT DOCUMENTS

JP    2004-259018 A    9/2004
JP    2019-016343 A    1/2019
(Continued)

OTHER PUBLICATIONS

International Search Report of the corresponding International application No. PCT/JP2022/007297 mailed May 17, 2022 and English translation thereof.
(Continued)

*Primary Examiner* — James R Turchen
(74) *Attorney, Agent, or Firm* — Muncy, Geissler, Olds & Lowe, P.C.

(57) ABSTRACT

A time/date adjustment apparatus includes an authentication unit configured to perform authentication processing with an external system managing schedule information of a belonging member belonging to an organization being a member of the time/date adjustment apparatus and a site to be used by the belonging member. The authentication unit performs first authentication processing with the external system, by using an administrator privilege account of the external system. After the first authentication processing succeeds, the authentication unit acquires belonging member information and site information from the external system by using the administrator privilege account, the belonging member information and the site information including information that is not allowed to be acquired using an account not having an administrator privilege of the external system.

15 Claims, 14 Drawing Sheets

(56) References Cited

U.S. PATENT DOCUMENTS

| | | | | |
|---|---|---|---|---|
| 10,339,503 | B1* | 7/2019 | Roth | G06Q 10/1095 |
| 11,250,386 | B2* | 2/2022 | Byun | G06Q 10/1095 |
| 2006/0265262 | A1* | 11/2006 | Kamdar | G06Q 10/109 705/80 |
| 2011/0184943 | A1* | 7/2011 | Norton | G06Q 10/02 707/723 |
| 2015/0186850 | A1* | 7/2015 | Ramji | G06Q 10/1095 705/7.19 |
| 2015/0200978 | A1* | 7/2015 | Putterman | H04L 12/1827 709/204 |
| 2015/0227728 | A1* | 8/2015 | Grigg | H04W 4/029 726/4 |
| 2015/0347983 | A1* | 12/2015 | Jon | G06F 3/0488 705/7.19 |
| 2017/0109705 | A1* | 4/2017 | Guerra | G06Q 10/1095 |
| 2019/0180248 | A1* | 6/2019 | Byun | G06Q 10/1095 |
| 2019/0287073 | A1* | 9/2019 | Singh | G06Q 10/00 |
| 2020/0372140 | A1* | 11/2020 | Jaber | G06F 21/31 |
| 2021/0150487 | A1* | 5/2021 | Ghosh | G06Q 10/107 |
| 2022/0100263 | A1* | 3/2022 | Nagar | G05D 1/0016 |

FOREIGN PATENT DOCUMENTS

| | | |
|---|---|---|
| JP | 2019-219831 A | 12/2019 |
| JP | 2020-003941 A | 1/2020 |

OTHER PUBLICATIONS

Login. [online], Mar. 22, 2020. [retrieval date Apr. 27, 2022]. Internet: <URL:https://eeasy.jp/login> entire text. all drawings.

A business tool that revolutionizes schedule adjustment. [online]., Mar. 22, 2020. [retrieval date Apr. 27, 2022], Internet: <URL:https://eeasy.jp/> entire text. all drawings.

Business tool "eeasy" that automates schedule adjustment officially launched on May 12th! Already used by 1.000 companies. [online]., May 12, 2020. [retrieval date Apr. 27, 2022]. Internet:<URL:https://eeasy.jp/news/n001 1> entire text. all drawings.

Schedule adjustment service "eeasy", adjusting schedule, and at the same time, automating issuance URL of Web conferencing tool & notification to the other party. [online]., Jun. 25, 2020, [retrieval date Apr. 27, 2022], Internet: <URL:https://eeasy.jp/news/n0013> entire text, all drawings.

Schedule adjustment service "eeasy" starts to provide API that can easily incorporate schedule adjustment function on an external system. [online]., Jun. 30, 2020, [retrieval date Apr. 27, 2022]. Internet:<URL:https://eeasy.jp/news/n0014> entire text, all drawings.

Schedule adjustment service "eeasy" started to cooperate with Zoom. Additionally, targets of cooperation are a total of 4 tools including Meet, Teams, and Skype. [online].,Sep. 25, 2020, [retrieval date Apr. 27, 2022], Internet: <URL:https://eeasy.jp/news/n0015> entire text, all drawings.

Schedule adjustment service "eeasy", the industry's first to add a function that can consider "schedule-priority". [online], Nov. 25, 2020, [retrieval date Apr. 27, 2022]. Internet: <URL:https://eeasy.jp/news/n0016> entire text, all drawings.

Business tool "eeasy" that automates schedule adjustment officially launched on May 12th! Already used by 1,000 companies. [online], May 12, 2020, [retrieval date Apr. 27, 2022], Internet: <URL:https://www.atpress.ne.jp/news/212281> entire text, all drawings.

Schedule adjustment service "eeasy", adjusting schedule, and at the same time, automating issuance URL of Web conferencing tool & notification to the other party. [online], Jun. 25, 2020, [retrieval date Apr. 27, 2022], Internet: <URL:https://www.atpress.ne.jp/news/216203> entire text, all drawings,.

Schedule adjustment service "eeasy", the industry's first to add a function that can consider "schedule-priority". [online], Nov. 25, 2020, [retrieval date Apr. 27, 2022]. Internet: <URL:https://www.atpress.ne.jp/news/236592> entire text, all drawings.

Business tool "eeasy" that automates schedule adjustment officially launched on May 12th! Already used by 1,000 companies. [online], May 12, 2020, [retrieval date Apr. 27, 2022], Internet: <URL:https://prtimes.jp/main/html/rd/p/000000001.000057389.html> entire text, all drawings.

Schedule adjustment service "eeasy" starts to provide API that can easily incorporate schedule adjustment function on an external system. [online], Jun. 30, 2020. [retrieval date Apr. 27, 2022]. Internet: <URL:https://prtimes.jp/main/html/rd/p/000000002.000057389.html> entire text. all drawings.

Schedule adjustment service "eeasy" started to cooperate with Zoom. Additionally, targets of cooperation are a total of 4 tools including Meet, Teams, and Skype. [online], Sep. 25, 2020, [retrieval date Apr. 27, 2022], Internet: <URL:https://prtimes.jp/main/html/rd/p/000000003.000057389.html> entire text, all drawings.

Eeeasy [online]. Oct. 29, 2020, [retrieval date Apr. 27, 2022], Internet: <URL:https://mitsu-karn.com/single-documenU?f=3850&a=> entire text, all drawings.

Schedule adjustment tool "eeasy". [online], Dec. 24, 2020, [retrieval date Apr. 27, 2022], Internet: <URL:https://dl.liskul.com/article/?id=1000737>, entire text, all drawings.

Would you like to stop the manual work of scheduling? Schedule adjustment tool "eeasy". [online], Feb. 15, 2021, [retrieval date Apr. 27, 2022], Internet: <URL:https://symphonict.nesic.co.jp/ eeasy> entire text, all drawings.

* cited by examiner

FIG. 6

TIME/DATE EDITING SCREEN
CONFIRM "CANDIDATE TIME/DATES"

LOGGING IN: Mr./Ms. A

| CANDIDATE TIME/DATES |
| --- |
| 12/16 (WED) 09:30~10:30 |
| 13:30~16:00 |
| 12/17 (THU) 10:30~15:30 |
| 12/18 (FRI) 11:30~15:30 |
| 12/21 (MON) 10:00~12:00 |
| 12/22 (TUE) 09:30~12:00 |
| 12/24 (THU) 13:00~15:00 |
| 12/25 (FRI) 10:00~12:00 |
| 13:00~17:30 |

ISSUE URL

BACK

FIG. 8

TIME/DATE CONFIRMATION SCREEN

| | 12/13 (SUN) | 12/14 (MON) | 12/15 (TUE) | 12/16 (WED) | 12/17 (THU) | 12/18 (FRI) | 12/19 (SAT) |
|---|---|---|---|---|---|---|---|
| 08:00 | | | | | | | |
| 09:00 | | | | | | | |
| 10:00 | | | | | | | |
| 11:00 | | | | | | | |
| 12:00 | | | | | 902 | | |
| 13:00 | | | | | | | |
| 14:00 | | | | | | | |
| 15:00 | | | | | | | |
| 16:00 | | | | | | | |
| 17:00 | | | | | | | |
| 18:00 | | | | | | | |

ASSEMBLY DETAIL

TIME/DATE
12/17 (THU)
11:00~12:00

TIME/DATE OF ASSEMBLY WILL BE NOTIFIED.

YOUR EMAIL ADDRESS

☑ RECEIVE AFTER CONFIRMATION
☐ RECEIVE REMINDER

BACK    CONFIRM

FIG. 11

TEMPLATE LIST SCREEN FOR ADJUSTMENT CONDITION     LOGGING IN: Mr./Ms. A

[NEWLY CREATE] — 1101

| NAME FOR MANAGEMENT | DESCRIPTION | ADJUSTMENT URL | OPERATION |
|---|---|---|---|
| FOR FIRST INTERVIEW, RECRUITMENT OF NEW GRADUATE | FOR RECEIVING FIRST INTERVIEW OF NEW GRADUATE RECRUITMENT INTERVIEW. ONE OF AA, BB, CC AND DD BEING MANAGERS IS INTERVIEWER. | https://xxx.x xxx.jp/xxxx/x xxxx | EDIT — 1103<br>COPY URL — 1104 |
| FOR SECOND INTERVIEW, RECRUITMENT OF NEW GRADUATE | FOR RECEIVING SECOND INTERVIEW OF NEW GRADUATE RECRUITMENT INTERVIEW. ONE OF EE AND FF BEING GENERAL MANAGERS IS INTERVIEWER. | https://xxx.x xxx.jp/xxxx/x xxxx | EDIT<br>COPY URL |
| FOR FINAL INTERVIEW, RECRUITMENT OF NEW GRADUATE | FOR RECEIVING FINAL INTERVIEW OF NEW GRADUATE RECRUITMENT INTERVIEW. GG BEING MANAGING DIRECTOR IS INTERVIEWER. | https://xxx.x xxx.jp/xxxx/x xxxx | EDIT<br>COPY URL |
| FOR SALES FOR INQUIRY | FOR RECEIVING BUSINESS DISCUSSION CONCERNING INQUIRY ABOUT YY SERVICE. THIS IS AUTOMATICALLY ASSIGNED TO MEMBER(S) OF SALES DEPARTMENT I OF XYZ DIVISION. | https://xxx.x xxx.jp/xxxx/x xxxx | EDIT<br>COPY URL |

FIG. 12

TEMPLATE CREATION SCREEN FOR ADJUSTMENT CONDITION — 1200

LOGGING IN: Mr./Ms. A

THIS IS TEMPLATE FOR ADJUSTMENT CONDITION TO ENABLE ADJUSTMENT OF TIME/DATE USING SAME URL AGAIN AND AGAIN. INPUT ADJUSTMENT CONDITION AND OTHER SETTING VALUES.

- NAME FOR MANAGEMENT: FOR RECRUITMENT INTERVIEW (FIRST INTERVIEW FOR ENGINEER), XYZ DIVISION — 1201
- DESCRIPTION: FOR FIRST INTERVIEW FOR RECRUITMENT OF ENGINEER. HH, II, AND JJ BEING MANAGERS ARE AUTOMATICALLY ASSIGNED AS INTERVIEWERS. — 1202
- ADJUSTMENT URL: https://xxxxx.xxx.jp/xxxxxx/ [job-interview-001] — 1203
- INPUT ITEMS OF ADJUSTMENT PARTNER: ☑ NAME  ☑ EMAIL ADDRESS  ☐ COMPANY NAME/SCHOOL NAME — 1204
- TOPIC OF PLAN TO BE REGISTERED: FIRST INTERVIEW FOR ENGINEER: {$ADJUSTMENT PARTNER. NAME} — 1205
- MAKE PLAN TO BE CLOSED: ☐ REGISTER AS CLOSED PLAN — 1206

TIME/DATE ADJUSTMENT APPARATUS, TIME/DATE ADJUSTMENT METHOD, AND NON-TRANSITORY COMPUTER-READABLE STORAGE MEDIUM THEREFOR

TECHNICAL FIELDS

The present invention relates to a time/date adjustment apparatus, a time/date adjustment method, and a program. The present invention claims priority to Japanese Patent Application 2021-046719 filed on Mar. 21, 2021, the contents of which are incorporated herein by reference for designated states where incorporation by reference to the literature is permitted.

BACKGROUND ART

Conventionally, adjustment of a time/date (time and date) of an assembly in business requires a large number of steps such as checking of a schedule of each participant and securing a site, and is therefore considerably bothersome work taking time and efforts.

Note that, regarding checking of schedules of participants, it is considered that a calendar tool is referred to, as many businesspersons manage their plans using a calendar tool provided on the Internet in recent years.

Regarding the calendar tool, for example, PTL 1 provides the following description: "a schedule information sharing method including the steps of: performing membership application registration by each of a plurality of applicants and a plurality of users, the plurality of applicants applying for distribution of schedule information, the plurality of users using the schedule information of the distribution, the plurality of applicants and the plurality of users each being a member of a system that distributes and shares the schedule information via the Internet; executing by a scheduler performing schedule management below; disclosing and distributing, by the applicant, the schedule information to the user; registering, by the user, a target desiring distribution of the disclosed schedule information; and based on a registered desired distribution target of the user, synchronizing and presetting the schedule information related thereto to a calendar of all of user terminals."

CITATION LIST

Patent Literature

PTL 1: JP 2019-219831 A

SUMMARY OF INVENTION

Technical Problem

In a technique described in PTL 1, a plurality of users being members of a system can share schedule information with each other, and use the schedule information for adjustment of a time/date of an assembly. However, even if the system is used, schedules of participants in a meeting or the like may be updated and changed from moment to moment, which makes it difficult to perform adjustment of a time/date of the assembly without causing an overlap between existing plans of each of the participants and time at which the assembly is held, in other words, without causing a double booking.

On an assumption that employees belonging to a company use a common calendar tool, there exists a time/date adjustment tool that performs adjustment of a time/date of an assembly cooperatively with the calendar tool. However, a conventional time/date adjustment tool assumes that it can be used only with accounts of regular employees not having administrator privileges of the calendar tool, and therefore does not have a mechanism of allowing acquisition and utilization of information on the calendar tool that cannot be acquired unless an account having the administrator privileges is used. Thus, in the time/date adjustment tool, persons who can be designated as participants of an assembly are limited to employees using the time/date adjustment tool and a part of employees intentionally sharing schedule information with the employees using special settings. In the time/date adjustment tool, as a site (a meeting room or the like) of the assembly to be secured at the time of time/date adjustment, a site cannot be selected, or even if a site can be selected, selectable sites are limited to only a part of sites. In other words, operations that can be performed in operations of registering plans on the calendar tool, such as freely selecting an employee of the same company as an attendee of the assembly and freely selecting a site to be used in the assembly, cannot be implemented at the time of time/date adjustment using the conventional time/date adjustment tool.

The present invention is made in view of such circumstances as described above, and has an object to enable free selection of a participant in an assembly out of persons belonging to the same organization and allow adjustment of a time/date of the assembly to be easily performed without causing a double booking, and enable free selection of a site to be used for an assembly out of sites available to persons belonging to the same organization and allow adjustment of a time/date of the assembly, including securing of the site, to be easily performed without causing a double booking.

Solution to Problem

The present application includes a plurality of solutions to at least a part of the problems described above, examples of which are described as follows.

In order to solve the problems described above, a time/date adjustment apparatus according to one aspect of the present invention includes: an authentication unit configured to perform authentication processing with an external system managing schedule information of a belonging member belonging to an organization being a member of the time/date adjustment apparatus; an adjustment condition setting unit configured to set an adjustment condition related to an assembly; and a time/date adjustment unit configured to adjust an assembly time/date based on the adjustment condition. The authentication unit performs first authentication processing with the external system, by using an administrator privilege account of the external system. After the first authentication processing succeeds, the authentication unit acquires belonging member information managed by the external system from the external system by using the administrator privilege account, the belonging member information including information that is not allowed to be acquired using an account not having an administrator privilege of the external system. The adjustment condition setting unit sets the adjustment condition including a participant in the assembly selected out of a belonging member list based on the belonging member information, based on an input of an adjustment initiator being the belonging member of the organization and a user of the time/date adjustment apparatus. When an adjustment partner performs access based on access information, the time/date adjustment unit refers to the schedule information of the participant managed by the external system, and extracts candidate time/dates that are available time/dates of the participant satisfying the adjustment condition. The time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen. The time/date adjustment unit registers the determined assembly time/date in the schedule information of the participant managed by the external system.

The authentication unit can associate the adjustment initiator with the belonging member information as the user of the time/date adjustment apparatus, when the adjustment initiator logs in to the time/date adjustment apparatus for first time using a user account of the adjustment initiator for the external system, the authentication unit performs second authentication processing with the external system by using the user account used in the login by the adjustment initiator, the second authentication processing succeeds, and it is confirmed that the user account used in the login by the adjustment initiator is included in the belonging member information acquired from the external system.

The adjustment condition setting unit can cause a first terminal apparatus used by the adjustment initiator to display a condition setting screen for setting the adjustment condition, and set the adjustment condition based on the input of the adjustment initiator on the condition setting screen. The time/date adjustment unit can refer to the schedule information of the participant managed by the external system, and extract available time/dates of the participant satisfying the adjustment condition as first candidate time/dates. The time/date adjustment unit can cause the first terminal apparatus to display a time/date editing screen for editing the extracted first candidate time/dates, and determine second candidate time/dates edited based on the input of the adjustment initiator on the time/date editing screen. The time/date adjustment unit can issue the access information for the time/date adjustment screen. When the second terminal apparatus used by the adjustment partner performs access based on the access information, the time/date adjustment unit can refer to the schedule information of the participant, and extract third candidate time/dates that are available time/dates of the participant satisfying the adjustment condition and are within a range of the second candidate time/dates. The time/date adjustment unit can cause the second terminal apparatus to display the time/date adjustment screen presenting the extracted third candidate time/dates, and determine the assembly time/date out of the extracted third candidate time/dates based on the selection operation of the adjustment partner on the time/date adjustment screen. The time/date adjustment unit can register the determined assembly time/date in the schedule information of the participant managed by the external system.

The participant can be the adjustment initiator themselves, or the belonging member belonging to the organization same as the adjustment initiator, the belonging member being other than the adjustment initiator.

When a plurality of the participants are designated as the adjustment condition, based on the adjustment partner performing access based on the access information, the time/date adjustment unit can refer to the schedule information of all of the plurality of the participants managed by the external system, and extract the candidate time/dates that are the available time/dates common to all of the plurality of the participants satisfying the adjustment condition.

When a plurality of the participants are designated as the adjustment condition, based on the adjustment partner performing access based on the access information, the time/date adjustment unit can refer to the schedule information of all of the plurality of the participants managed by the external system, and extract the candidate time/dates that are the available time/dates of at least one of all of the plurality of the participants satisfying the adjustment condition.

A time/date adjustment apparatus according to another aspect of the present invention includes: an authentication unit configured to perform authentication processing with an external system managing schedule information of a site to be used for an assembly by a belonging member belonging to an organization being a member of the time/date adjustment apparatus; an adjustment condition setting unit configured to set an adjustment condition related to the assembly; and a time/date adjustment unit configured to adjust an assembly time/date based on the adjustment condition. The authentication unit performs first authentication processing with the external system, by using an administrator privilege account of the external system. After the first authentication processing succeeds, the authentication unit acquires site information managed by the external system from the external system by using the administrator privilege account, the site information including information that is not allowed to be acquired using an account not having an administrator privilege of the external system. The adjustment condition setting unit sets the adjustment condition including a selected site selected out of a site list based on the site information, based on an input of an adjustment initiator being the belonging member of the organization and a user of the time/date adjustment apparatus. When an adjustment partner performs access based on access information, the time/date adjustment unit refers to the schedule information of the selected site managed by the external system, and extracts candidate time/dates that are available time/dates of the selected site satisfying the adjustment condition. The time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen. The time/date adjustment unit registers the determined assembly time/date in the schedule information of the selected site managed by the external system.

The adjustment condition setting unit can set the adjustment condition including a plurality of the selected sites selected out of the site list based on the site information, based on the input of the adjustment initiator. When the adjustment partner performs access based on the access information, the time/date adjustment unit can refer to the schedule information of the plurality of the selected sites managed by the external system, and extract the candidate time/dates that are the available time/dates of at least one site of the plurality of the selected sites satisfying the adjustment condition. The time/date adjustment unit can cause the second terminal apparatus used by the adjustment partner to display the time/date adjustment screen presenting the extracted candidate time/dates, and determine the assembly time/date out of the extracted candidate time/dates, based on the selection operation of the adjustment partner on the time/date adjustment screen. The time/date adjustment unit can register the determined assembly time/date in the schedule information of the selected site having the available time/date on the determined assembly time/date out of the plurality of the selected sites, the schedule information being managed by the external system.

The adjustment condition setting unit can cause a first terminal apparatus used by the adjustment initiator to display a condition setting screen for setting the adjustment condition, and set the adjustment condition based on the input of the adjustment initiator on the condition setting screen. The time/date adjustment unit can refer to the schedule information of the selected site managed by the external system, and extract available time/dates of the selected site satisfying the adjustment condition as first candidate time/dates. The time/date adjustment unit can cause the first terminal apparatus to display a time/date editing screen for editing the extracted first candidate time/dates, and determine second candidate time/dates edited based on the input of the adjustment initiator on the time/date editing screen. The time/date adjustment unit can issue the access information for the time/date adjustment screen. When the second terminal apparatus used by the adjustment partner performs access based on the access information, the time/date adjustment unit can refer to the schedule information of the selected site, and extract third candidate time/dates that are available time/dates of the selected site satisfying the adjustment condition and are within a range of the second candidate time/dates. The time/date adjustment unit can cause the second terminal apparatus to display the time/date adjustment screen presenting the extracted third candidate time/dates, and determine the assembly time/date out of the extracted third candidate time/dates based on the selection operation of the adjustment partner on the time/date adjustment screen. The time/date adjustment unit can register the determined assembly time/date in the schedule information of the selected site managed by the external system.

The adjustment condition setting unit can cause a first terminal apparatus used by the adjustment initiator to display a template creation screen for creating an adjustment condition template. The adjustment condition setting unit can register the adjustment condition template that can be repeatedly used for adjustment of time/dates of different assemblies and the access information corresponding to the adjustment condition template, based on designation of the adjustment initiator on the template creation screen.

The adjustment condition setting unit can cause the first terminal apparatus to display a template list screen for selecting the adjustment condition template created in advance, and display the access information corresponding to the selected adjustment condition template for the adjustment initiator, based on selection of the adjustment initiator on the template list screen.

A time/date adjustment method according to yet another aspect of the present invention is performed by a time/date adjustment apparatus. The time/date adjustment method includes: an authentication step of performing authentication processing with an external system managing schedule information of a belonging member belonging to an organization being a member of the time/date adjustment apparatus; an adjustment condition setting step of setting an adjustment condition related to an assembly; and a time/date adjustment step of adjusting an assembly time/date based on the adjustment condition. The authentication step includes performing first authentication processing with the external system, by using an administrator privilege account of the external system. After the first authentication processing succeeds, the authentication step includes acquiring belonging member information managed by the external system from the external system by using the administrator privilege account, the belonging member information including information that is not allowed to be acquired using an account not having an administrator privilege of the external system. The adjustment condition setting step includes setting the adjustment condition including a participant in the assembly selected out of a belonging member list based on the belonging member information, based on an input of an adjustment initiator being the belonging member of the organization and a user of the time/date adjustment apparatus. When an adjustment partner performs access based on access information, the time/date adjustment step includes referring to the schedule information of the participant managed by the external system, and extracting candidate time/dates that are available time/dates of the participant satisfying the adjustment condition. The time/date adjustment step includes causing a second terminal apparatus used by the adjustment partner to display a time/date adjustment screen presenting the extracted candidate time/dates, and determining the assembly time/date out of the extracted candidate time/dates, based on a selection operation of the adjustment partner on the time/date adjustment screen. The time/date adjustment step includes registering the determined assembly time/date in the schedule information of the participant managed by the external system.

A program according to yet another aspect of the present invention causes a computer to function as a time/date adjustment apparatus, to function as: an authentication unit configured to perform authentication processing with an external system managing schedule information of a belonging member belonging to an organization being a member of the time/date adjustment apparatus; an adjustment condition setting unit configured to set an adjustment condition related to an assembly; and a time/date adjustment unit configured to adjust an assembly time/date based on the adjustment condition. The authentication unit performs first authentication processing with the external system, by using an administrator privilege account of the external system. After the first authentication processing succeeds, the authentication unit acquires belonging member information managed by the external system from the external system by using the administrator privilege account, the belonging member information including information that is not allowed to be acquired using an account not having an administrator privilege of the external system. The adjustment condition setting unit sets the adjustment condition including a participant in the assembly selected out of a belonging member list based on the belonging member information, based on an input of an adjustment initiator being the belonging member of the organization and a user of the time/date adjustment apparatus. When an adjustment partner performs access based on access information, the time/date adjustment unit refers to the schedule information of the participant managed by the external system, and extracts candidate time/dates that are available time/dates of the participant satisfying the adjustment condition. The time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen. The time/date adjustment unit registers the determined assembly time/date in the schedule information of the participant managed by the external system.

A time/date adjustment method according to yet another aspect of the present invention is performed by a time/date adjustment apparatus. The time/date adjustment method includes: an authentication step of performing authentication processing with an external system managing schedule information of a site to be used for an assembly by a belonging member belonging to an organization being a member of the time/date adjustment apparatus; an adjustment condition setting step of setting an adjustment condition related to the assembly; and a time/date adjustment step of adjusting an assembly time/date based on the adjustment condition. The authentication step includes performing first authentication processing with the external system, by using an administrator privilege account of the external system. After the first authentication processing succeeds, the authentication step includes acquiring site information managed by the external system from the external system by using the administrator privilege account, the site information including information that is not allowed to be acquired using an account not having an administrator privilege of the external system. The adjustment condition setting step includes setting the adjustment condition including a selected site selected out of a site list based on the site information, based on an input of an adjustment initiator being the belonging member of the organization and a user of the time/date adjustment apparatus. When an adjustment partner performs access based on access information, the time/date adjustment step includes referring to the schedule information of the selected site managed by the external system, and extracting candidate time/dates that are available time/dates of the selected site satisfying the adjustment condition. The time/date adjustment step includes causing a second terminal apparatus used by the adjustment partner to display a time/date adjustment screen presenting the extracted candidate time/dates, and determining the assembly time/date out of the extracted candidate time/dates, based on a selection operation of the adjustment partner on the time/date adjustment screen. The time/date adjustment step includes registering the determined assembly time/date in the schedule information of the selected site managed by the external system.

A program according to yet another aspect of the present invention causes a computer to function as a time/date adjustment apparatus, to function as: an authentication unit configured to perform authentication processing with an external system managing schedule information of a site to be used for an assembly by a belonging member belonging to an organization being a member of the time/date adjustment apparatus; an adjustment condition setting unit configured to set an adjustment condition related to the assembly; and a time/date adjustment unit configured to adjust an assembly time/date based on the adjustment condition. The authentication unit performs first authentication processing with the external system, by using an administrator privilege account of the external system. After the first authentication processing succeeds, the authentication unit acquires site information managed by the external system from the external system by using the administrator privilege account, the site information including information that is not allowed to be acquired using an account not having an administrator privilege of the external system. The adjustment condition setting unit sets the adjustment condition including a selected site selected out of a site list based on the site information, based on an input of an adjustment initiator being the belonging member of the organization and a user of the time/date adjustment apparatus. When an adjustment partner performs access based on access information, the time/date adjustment unit refers to the schedule information of the selected site managed by the external system, and extracts candidate time/dates that are available time/dates of the selected site satisfying the adjustment condition. The time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen. The time/date adjustment unit registers the determined assembly time/date in the schedule information of the selected site managed by the external system.

Advantageous Effects of Invention

According to the present invention, a participant in an assembly can be freely selected out of persons belonging to the same organization, and adjustment of a time/date of the assembly can be easily performed without causing a double booking. A site to be used for an assembly can be freely selected out of sites available to persons belonging to the same organization, and adjustment of a time/date of the assembly, including securing of the site, can be easily performed without causing a double booking.

Problems, configurations, and effects other than those described above will become apparent in the following description of embodiments.

BRIEF DESCRIPTION OF DRAWINGS

FIG. 6 is a diagram illustrating a display example of a time/date editing screen.

FIG. 8 is a diagram illustrating a display example of a time/date confirmation screen.

FIG. 11 is a diagram illustrating a display example of a template list screen.

FIG. 12 is a diagram illustrating a display example of a template creation screen.

DESCRIPTION OF EMBODIMENTS

One embodiment according to the present invention will be described below with reference to the drawings. Note that, in all the drawings for describing one embodiment, the same members are denoted by the same reference signs in principle, and repeated description thereof will be omitted. It goes without saying that, in the following embodiment, constituent elements (including element steps and the like) thereof are not necessarily essential, except for a case in which there is particular and explicit description, a case in which it is considered that those are obviously essential in principle, and the like. Concerning descriptions "to consist of A", "to be composed of A", "to have A", and "to include A", it goes without saying that, except for a case in which there is particular and explicit description that only the element is provided, and the like, elements other than the element are not to be excluded. Similarly, in the following embodiment, when there is a reference to a shape, a positional relationship, and the like of a constituent element and the like, a shape and the like that are substantially close to or similar to those shape and the like are included, except for a case in which there is particular and explicit description, a case in which it is considered that those are not obviously true in principle, and the like.

<Time/Date Adjustment System 10 according to One Embodiment of Present Invention>

Figure 1:
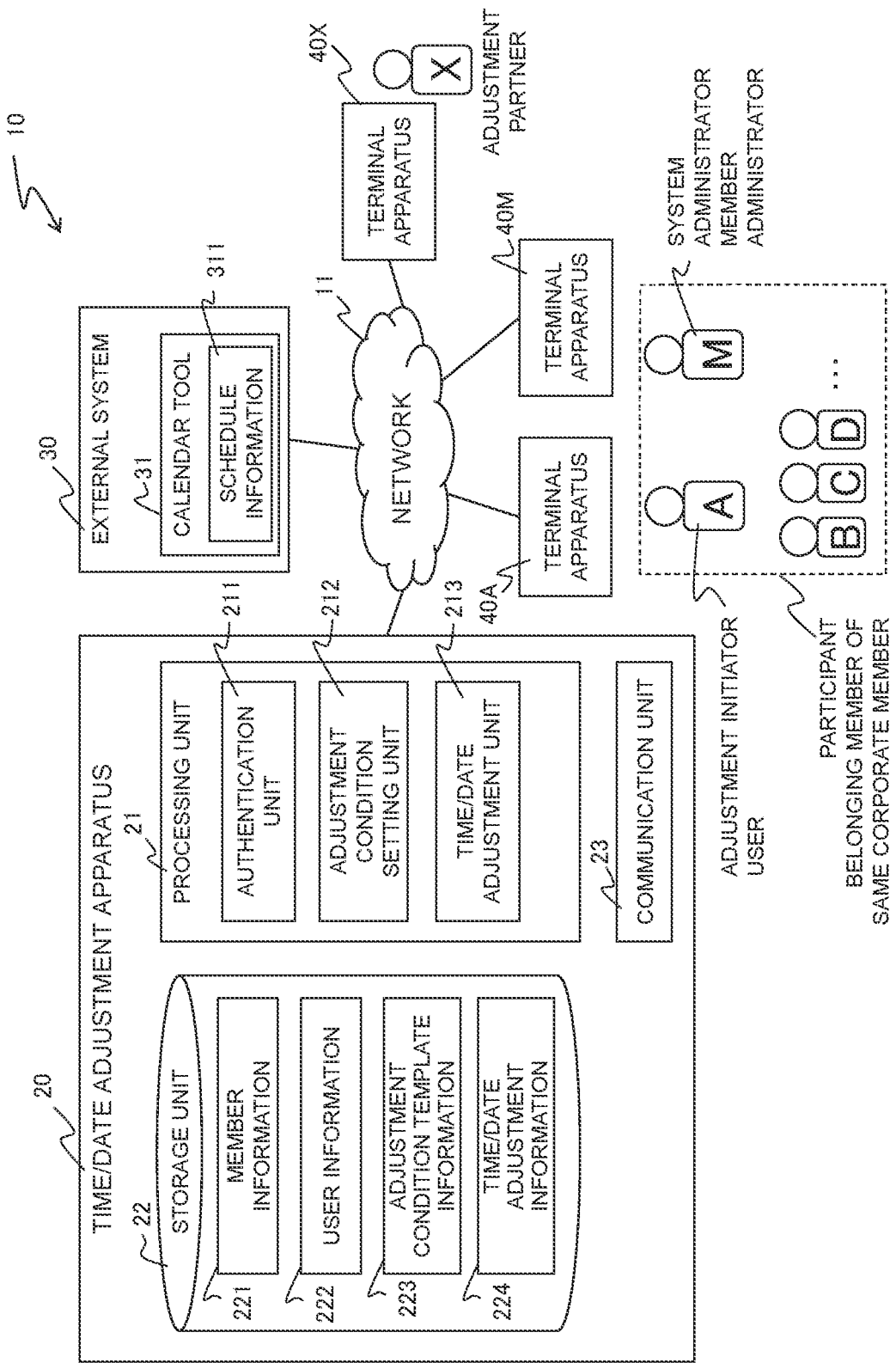
FIG. 1 is a diagram illustrating a configuration example of a time/date adjustment system according to one embodiment of the present invention.

FIG. 1 illustrates a configuration example of a time/date adjustment system 10 according to one embodiment of the present invention.

The time/date adjustment system 10 is for assisting adjustment of a time/date of an assembly. The time/date adjustment system 10 includes a time/date adjustment apparatus 20, an external system 30, and terminal apparatuses 40A, 40M, and 40X, which are connected via a network 11.

The network 11 is a two-way communication network, as typified by the Internet, a mobile phone communication network, and the like.

The time/date adjustment apparatus 20 performs adjustment of a time/date of an assembly with an adjustment partner X, in response to a request from an adjustment initiator A. Note that, in the assembly, participation of the adjustment initiator A, belonging members B, C, D, and the like (including a system administrator M of an organization to which the adjustment initiator A belongs) of the organization to which the adjustment initiator A belongs (a company or the like; a corporate member to be described below), and the adjustment partner X is assumed. Note that, in this specification, among persons to actually participate in the assembly, the adjustment initiator A and the belonging members of the organization to which the adjustment initiator A belongs are defined as "participants" of the assembly, and the adjustment partner X to participate in the assembly is not included in the "participants" (not referred to as a "participant").

The external system 30 refers to a system that widely provides a calendar tool 31 as a web application for general consumers, corporations, and the like with or without a charge. As the calendar tool 31, for example, Google Calendar (trademark) and Microsoft Outlook (trademark) can be employed. The calendar tool 31 stores schedule information 311, in which action plans of a user of the calendar tool 31 and a booking status of assembly sites available to the user are registered.

The terminal apparatus 40A used by the adjustment initiator A includes a general computer, such as a personal computer and a smartphone, that can connect to the time/date adjustment apparatus 20 via the network 11. Similarly, the terminal apparatus 40M used by the system administrator M and the terminal apparatus 40X used by the adjustment partner X each include a general computer. The terminal apparatus 40A corresponds to a first terminal apparatus of the present invention, and the terminal apparatus 40X corresponds to a second terminal apparatus of the present invention.

Note that, in the present embodiment, the adjustment partner X to participate in an assembly operates the terminal apparatus 40X; however, in actuality, a representative (a secretary or the like) of the adjustment partner X may operate the terminal apparatus 40X. The adjustment initiator A may select a plurality of participants out of the belonging members of the same organization (corporate member to be described below) as the adjustment initiator A, and the adjustment initiator A may perform adjustment of a time/date on behalf of the plurality of participants.

Moreover, in FIG. 1, only the adjustment partner X is illustrated as an adjustment partner to participate in a meeting; however, there may be a plurality of adjustment partners.

The adjustment initiator A is a belonging member of a company or the like that has conducted use registration with the time/date adjustment apparatus 20. The company or the like that has conducted use registration with the time/date adjustment apparatus 20 is hereinafter referred to as a corporate member. Among belonging members belonging to the corporate member (company or the like), a belonging member having a user account of the time/date adjustment apparatus 20 is defined as a user. It is essential that the adjustment initiator A be a user. Thus, the adjustment initiator A may be hereinafter referred to as a user A.

The system administrator M and the belonging members B, C, D, and the like belonging to the same corporate member as the adjustment initiator A, other than the adjustment initiator A, may be users, but this is not essential.

Belonging members belonging to the corporate member of the time/date adjustment apparatus 20 manage their plans, using the calendar tool 31 provided by the external system 30. The corporate member of the time/date adjustment apparatus 20 manages the booking status of a meeting room, a reception room, a spare room, and the like available to the belonging members as an assembly site, using the calendar tool 31 provided by the external system 30.

Thus, in the present case, the calendar tool 31 stores the schedule information 311 in which each of plans of the adjustment initiator A and the like who may be participants of an assembly and the booking status of assembly sites available to the adjustment initiator A and the like is registered.

Note that the adjustment partner X may be a user of the time/date adjustment apparatus 20, but this is not essential. The adjustment partner X may use the calendar tool 31, but this is not essential. The adjustment partner X may use a calendar tool provided by a vendor different from a vendor of the calendar tool 31 used by the adjustment initiator A.

The time/date adjustment apparatus 20 includes functional blocks of a processing unit 21, a storage unit 22, and a communication unit 23. The time/date adjustment apparatus 20 includes a general computer such as a server computer including a processor such as a central processing unit (CPU), a memory such as a dynamic random access memory (DRAM), a storage such as a hard disk drive (HDD) and a solid state drive (SSD), an input device such as a keyboard, a mouse, and a touch panel, an output device such as a display, and a communication module such as a network interface card (NIC) (all of which are not illustrated).

The processing unit 21 is implemented by the processor of the computer. The processing unit 21 includes functional blocks of an authentication unit 211, an adjustment condition setting unit 212, and a time/date adjustment unit 213. These functional blocks are implemented by the processor of the computer executing a predetermined program loaded in the memory. Note that a part or all of these functional blocks may be implemented as hardware by an integrated circuit or the like.

For example, the authentication unit 211 receives member registration performed by the system administrator M using the terminal apparatus 40M, and creates member information 221. For example, in response to a first login of a user performed by the adjustment initiator A using the terminal apparatus 40A, and when a predetermined condition is satisfied, the authentication unit 211 creates user information 222.

Moreover, the authentication unit 211 accesses the external system 30 via the network 11, and for example, performs authentication processing in accordance with a protocol such as OAuth, using an administrator privilege account included in the member information 221 and a user account included in the user information 222 corresponding to the adjustment initiator (user) A (both in FIG. 2) stored in the storage unit 22. Note that the administrator privilege account and the user account may be used in first authentication processing, and in second and following authentication processing, administrator authentication information (an access token or the like) and user authentication information (an access token or the like) (both in FIG. 2) transmitted from the external system 30 after the first authentication processing has ended can be used.

The adjustment condition setting unit 212 causes the terminal apparatus 40A to display a condition setting screen for setting an adjustment condition including a plurality of items necessary for adjustment of a time/date of an assembly, sets the adjustment condition in response to an input from the adjustment initiator A on the condition setting screen, and registers results in time/date adjustment information 224 corresponding to the adjustment initiator A stored in the storage unit 22. The items of the adjustment condition will be described below.

The time/date adjustment unit 213 refers to the schedule information 311 of the participants (which may or may not include the adjustment initiator A) of the assembly being managed by the calendar tool 31, and extracts first candidate time/dates that are available time/dates with no plans of the participants and satisfy the set adjustment condition. Then, the time/date adjustment unit 213 causes the terminal apparatus 40A to display a time/date editing screen for editing the first candidate time/dates, and determines second candidate time/dates in response to an editing operation from the adjustment initiator A on the time/date editing screen. The second candidate time/dates are registered in the time/date adjustment information 224 corresponding to the adjustment initiator A. When the first candidate time/dates are not edited by the adjustment initiator A, the first candidate time/dates and the second candidate time/dates are the same.

The time/date adjustment unit 213 issues an adjustment Uniform Resource Locator (URL) for the adjustment partner X to access a time/date adjustment screen. Note that, without the time/date adjustment unit 213 issuing the adjustment URL, the adjustment initiator A may designate the adjustment URL (details will be described below). Note that the adjustment URL may be issued as text, or may be issued as an image such as a QR code. The issued adjustment URL is transmitted to the adjustment partner X by the adjustment initiator A, using an electronic mail or the like. The adjustment URL corresponds to access information of the present invention.

Moreover, when the adjustment partner X accesses the adjustment URL by using the terminal apparatus 40X, the time/date adjustment unit 213 refers to the schedule information 311 of the participants at that time point being managed by the calendar tool 31 again, and extracts third candidate time/dates that are available time/dates with no plans of the participants, satisfy the set adjustment condition, and are within a range of the second candidate time/dates. Then, the time/date adjustment unit 213 causes the terminal apparatus 40X to display the time/date adjustment screen presenting the third candidate time/dates.

By extracting the third candidate time/dates, even if there is a change in the schedule of the participants during time from when the adjustment URL is issued to when the adjustment partner X accesses the adjustment URL, occurrence of a double booking due to such a change can be suppressed.

Furthermore, the time/date adjustment unit 213 registers the assembly time/date selected by the adjustment partner X out of the third candidate time/dates displayed on the time/date adjustment screen and confirmed in a confirmation screen, in the schedule information 311 of the participants being managed by the calendar tool 31, and registers the assembly time/date in the time/date adjustment information 224 corresponding to the adjustment initiator A stored in the storage unit 22. Note that the schedule of the participants may be changed even during a short period of time until the adjustment partner X selects the assembly time/date out of the third candidate time/dates displayed on the time/date adjustment screen and confirms the assembly time/date on the confirmation screen. Thus, the time/date adjustment unit 213 may perform final check that the selected assembly time/date is an available time/date of the participants and satisfies the adjustment condition, immediately before the assembly time/date is confirmed on the confirmation screen. Then, if the selected assembly time/date is no longer an available time/date, for example, a message such as "The designated time has been occupied. Select again" may be displayed on the terminal apparatus 40X, and the operation may be returned back to the time/date adjustment screen. With this configuration, occurrence of a double booking can be further suppressed.

The storage unit 22 is implemented by the memory and the storage of the computer. The storage unit 22 stores the member information 221, the user information 222, adjustment condition template information 223, and the time/date adjustment information 224. Note that the storage unit 22 may store information other than the information described above.

The communication unit 23 is implemented by the communication module of the computer. The communication unit 23 connects to the external system 30, the terminal apparatuses 40A, 40M, and 40X, and the like via the network 11 and communicates various pieces of data and information therewith.

Note that a part or all of the above-described functional blocks constituting the time/date adjustment apparatus 20 may be implemented by hardware such as an integrated circuit. The time/date adjustment apparatus 20 may be implemented by a plurality of computers, and in that case, the above-described functional blocks may be distributedly deployed in the plurality of computers.

Figure 2:
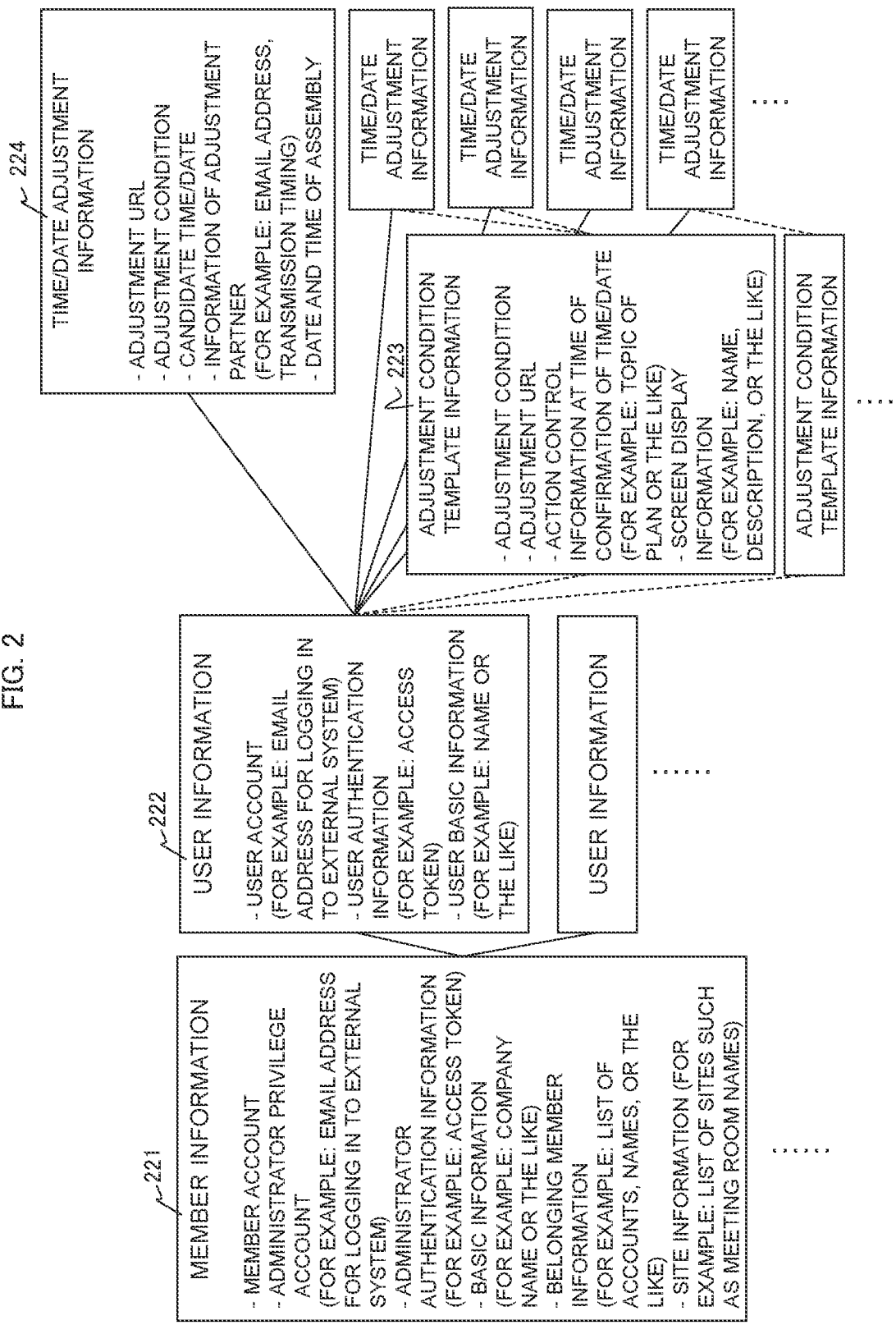
FIG. 2 is a diagram illustrating an example of each of member information, user information, adjustment condition template information, and time/date adjustment information.

Next, FIG. 2 illustrates an example of the member information 221, the user information 222, the adjustment condition template information 223, and the time/date adjustment information 224 stored in the storage unit 22.

The member information 221 includes information related to a corporate member that has conducted use registration with the time/date adjustment apparatus 20. Specifically, the member information 221 includes a member account, an administrator privilege account, administrator authentication information, basic information, belonging member information, and site information.

The member account is information for a system administrator or the like of the corporate member (company or the like) to log in to the time/date adjustment apparatus 20. The administrator privilege account is information for the system administrator or the like of the corporate member (company or the like) to access the external system 30 by using the administrator privileges. Note that the member account is desirably common to, but may be different from, the administrator privilege account (for example, an email address of the system administrator or the like). When the member account and the administrator privilege account are common to each other, registration of the administrator privilege account with the member information 221 may be omitted.

The administrator authentication information is an access token or the like that is obtained from the external system 30 as success results of the authentication processing when the authentication unit 211 of the time/date adjustment apparatus 20 performs the authentication processing with the external system 30 for the first time, using the administrator privilege account. After the administrator authentication information is obtained, the authentication unit 211 can more promptly perform the authentication processing with the external system 30 by using the administrator authentication information, without using the administrator privilege account.

The basic information is a name of the corporate member (a company name or the like) or the like. The basic information is recorded at the time of member registration. The belonging member information is a list of names of belonging members belonging to the corporate member (company or the like), user accounts for accessing the external system 30, and the like. The belonging member information is acquired from the external system 30 and then recorded on an assumption that the belonging members of the corporate member who may be participants on the adjustment initiator A side already use the calendar tool 31.

The site information is a list of names of sites, such as a meeting room, a reception room, and a spare room, available to the belonging members belonging to the corporate member for an assembly, identification IDs of the sites in the external system, and the like. The site information is acquired from the external system 30 and then recorded on an assumption that the schedules of all of the sites necessary for time/date adjustment are already managed by the calendar tool 31.

Note that the belonging member information and the site information are information that can be partially or entirely acquired from the external system 30 only when the external system 30 is accessed using the administrator privilege account, and cannot be acquired (it is to be noted that the information can be partially acquired in some cases) when an account not having the administrator privileges is used instead of the administrator privilege account or when the external system 30 is accessed using an account that has privileges equivalent to the administrator privilege account but is used as a user account, for example.

The user information 222 includes information related to a user who has conducted use registration of the time/date adjustment apparatus 20 among the belonging members belonging to the corporate member. The user information 222 is created when each user logs in to the time/date adjustment apparatus 20 for the first time, succeeds in the authentication processing with the external system 30, and it is confirmed that the user is included in the belonging member information of the member information 221, and is then associated with the member information 221.

The user information 222 includes a user account, user authentication information, and user basic information.

The user account is information for the user, such as the adjustment initiator A, to log in to the time/date adjustment apparatus 20. The user account is desirably common to, but may be different from, an account for the user to access the external system 30. The following description will be given based on an assumption that the user account is common to an account for accessing the external system 30.

The user authentication information is an access token or the like that is obtained from the external system 30 as success results of the authentication processing when the authentication unit 211 performs the authentication processing with the external system 30 for the first time, using the user account. After the user authentication information is obtained, the authentication unit 211 can more promptly perform the authentication processing with the external system 30, using the user authentication information, without using the user account.

The user basic information is a name of the user or the like, and is read from the belonging member information of the member information 221 based on the user account used by the user in logging in to the time/date adjustment apparatus 20 for the first time, and is then recorded.

The adjustment condition template information 223 includes an adjustment condition, an adjustment URL, action control information (a topic and the like of a plan to be registered in the schedule information 311 of the participant or the like) at the time of confirmation of a time/date, and screen display information (a name (for example, "for a first interview for recruitment of a new graduate" and the like), a description, and the like of an adjustment condition template), which are designated by the user in advance depending on a purpose of the assembly. The adjustment condition template is created by the user, and the adjustment condition template information 223 is thus associated with the user information 222; however, for example, the adjustment condition template information 223 may be associated with the member information 221, such that the adjustment condition template information 223 may be shared between users belonging to the corporate member corresponding to the member information 221. An adjustment condition template created by one user may be used by another user.

The time/date adjustment information 224 is created in association with each user for each assembly in which the user is the adjustment initiator. Note that, considering that a user different from the user who has created the template information adjusts a time/date using the time/date adjustment template information, the time/date adjustment information 224 may be directly associated with the member information 221 of a member to which the user belongs.

In the time/date adjustment information 224, the adjustment URL, the adjustment condition, the candidate time/dates (the second and third candidate time/dates), information (an email address, a timing of transmitting a notification email, and the like) of the adjustment partner, a confirmed date and time of the assembly, and the like are recorded.

<Processing Performed by Time/Date Adjustment System 10 at Time of Use Registration>

Figure 3:
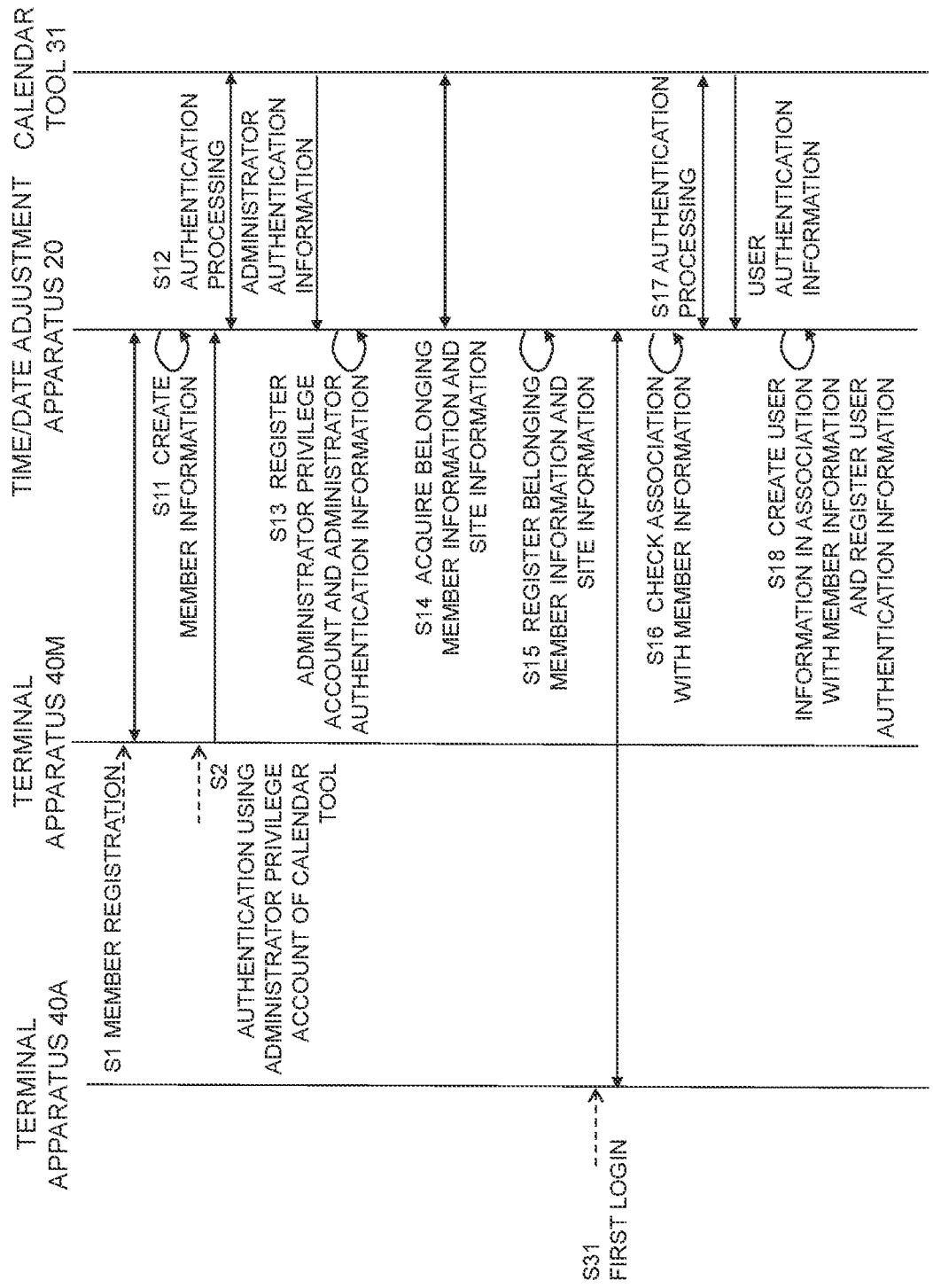
FIG. 3 is a sequence diagram for illustrating an example of processing performed by the time/date adjustment system at the time of use registration.

Next, FIG. 3 is a sequence diagram for illustrating an example of processing performed by the time/date adjustment system 10 at the time of use registration.

As an assumption, the calendar tool 31 is used for management of plans of the belonging members of the corporate member to which the adjustment initiator A and the system administrator M belong and availability of the assembly sites, and the calendar tool 31 already manages the belonging member information and the site information recorded in the member information 221. Further, the calendar tool 31 supplies, as its specifications, at least one of the belonging member information and the site information recorded in the member information 221 to the time/date adjustment apparatus 20, in response to a request from the time/date adjustment apparatus 20 accessed using the administrator privilege account (or the administrator authentication information).

First of all, when the system administrator M performs member registration with the time/date adjustment apparatus 20 via the network 11 by using the terminal apparatus 40M (Step S1), the authentication unit 211 of the time/date adjustment apparatus 20 creates the member information 221 and records the member information 221 in the storage unit 22 (Step S11). Note that, here, the created member information 221 includes only the member account and the basic information, and does not include the administrator privilege account, the administrator authentication information, the belonging member information, and the site information.

Next, when the system administrator M inputs the administrator privilege account for the calendar tool 31 and requests the authentication processing with the time/date adjustment apparatus 20 (Step S2), next, the authentication unit 211 performs the authentication processing with the external system 30, using the administrator privilege account (Step S12). The authentication processing of Step S12 corresponds to first authentication processing of the present invention.

Note that, as a modification, Steps S1 and S11 may be executed after execution of Steps S2 and S12.

Then, the administrator authentication information (access token or the like) is transmitted from the external system 30 to the time/date adjustment apparatus 20 as success results of the authentication processing of Step S12, and thus, next, the authentication unit 211 registers the administrator privilege account and the administrator authentication information in the member information 221 created and recorded in Step S11 (Step S13). Note that, for the authentication processing, OAuth can be used, for example, and by having the system administrator M input a password to the external system 30 temporarily without using the authentication unit 211, the administrator privilege account input by the system administrator M is authenticated by the external system 30. The same holds true for the authentication processing performed by other persons such as the adjustment initiator A.

Next, the authentication unit 211 connects to the external system 30 by using the administrator authentication information of the member information 221, and acquires the belonging member information and the site information of the corporate member to which the system administrator M belongs, which are managed by the external system 30 (Step S14). Next, the authentication unit 211 registers the belonging member information and the site information acquired in Step S14 in the member information 221 created and recorded in Step S11 (Step S15).

Subsequently, when the adjustment initiator A uses the user account of the adjustment initiator A and logs in to the time/date adjustment apparatus 20 via the network 11 for the first time, using the terminal apparatus 40A (Step S31), the authentication unit 211 of the time/date adjustment apparatus 20 checks presence of the member information 221 in which the belonging member information including the user account of the adjustment initiator A is registered, and acquires the name (user basic information) of the adjustment initiator A from the belonging member information (Step S16). Next, the authentication unit 211 performs the authentication processing with the external system 30, using the user account of the adjustment initiator A (Step S17). The authentication processing of Step S17 corresponds to second authentication processing of the present invention.

Then, the user authentication information (access token or the like) is transmitted from the external system 30 to the time/date adjustment apparatus 20 as success results of the authentication processing of Step S17, and thus, next, the authentication unit 211 creates the user information 222 corresponding to the adjustment initiator A, records the user information 222 in the storage unit 22 in association with the member information 221 checked in Step S16, and registers the user account and the user authentication information of the adjustment initiator A and the user basic information acquired in Step S16 in the user information 222 (Step S18). Through the above processing, the processing at the time of use registration ends.

According to the processing at the time of use registration described above, the member information 221 of the corporate member to which the adjustment initiator A belongs and the user information 222 of the adjustment initiator A are associated with each other. Thus, after the processing, even if the system administrator M is not logged in to the time/date adjustment apparatus 20, on the condition that the adjustment initiator A being a user is logged in to the time/date adjustment apparatus 20, for example, the time/date adjustment unit 213 of the time/date adjustment apparatus 20 can refer to and update the schedule information 311 in which action plans of the adjustment initiator A and the belonging members belonging to the same corporate member as the adjustment initiator A are registered and the schedule information 311 in which plans of assembly sites (a meeting room and the like) available to the adjustment initiator A and the belonging members belonging to the same corporate member as the adjustment initiator A are registered, which are stored in the calendar tool 31, via a web application programming interface (API).

Note that, in the processing at the time of use registration described above, the user information of the user belonging to the corporate member is generated, on an assumption that the member information 221 of the corporate member is present. As a modification, when an organization to which a certain individual belongs is not the corporate member and the member information 221 thereof is thus not present, the certain individual may log in to the time/date adjustment apparatus 20 and create the user information 222, and the individual may subsequently perform anew the authentication processing with the external system 30 by using the administrator privilege account, and the member information 221 associated with the individual may be thereby generated based on the user information 222 of the individual, with the individual being regarded as the corporate member and a user account of the individual being regarded as a member account. In this case, the individual as the corporate member has the administrator privilege account, and can thus acquire the belonging member information and the site information of the organization to which the individual belongs from the external system 30.

Figure 5:
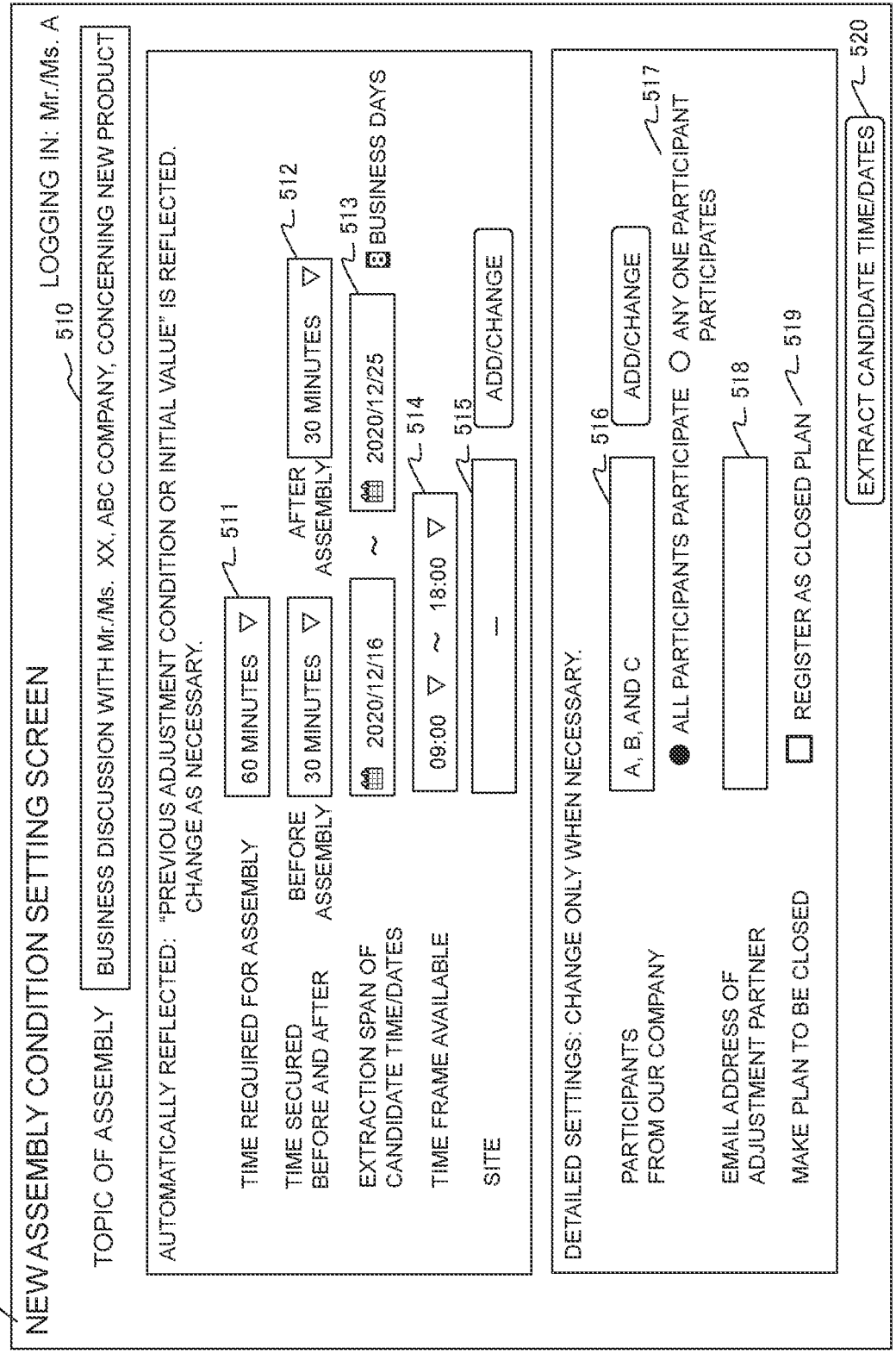
FIG. 5 is a diagram illustrating a display example of the condition setting screen.

In the present embodiment, the belonging member information and the site information acquired from the calendar tool 31 are registered in the member information 221 stored in the storage unit 22; however, without the belonging member information and the site information being registered in the member information 221, the belonging member information and the site information may be acquired from the calendar tool 31 every time the pieces of information are to be referred to (when, for example, participant (s) and a site are selected in FIG. 5 to be described below).

<Time/Date Adjustment Processing Performed by Time/Date Adjustment System 10>

Figure 4:
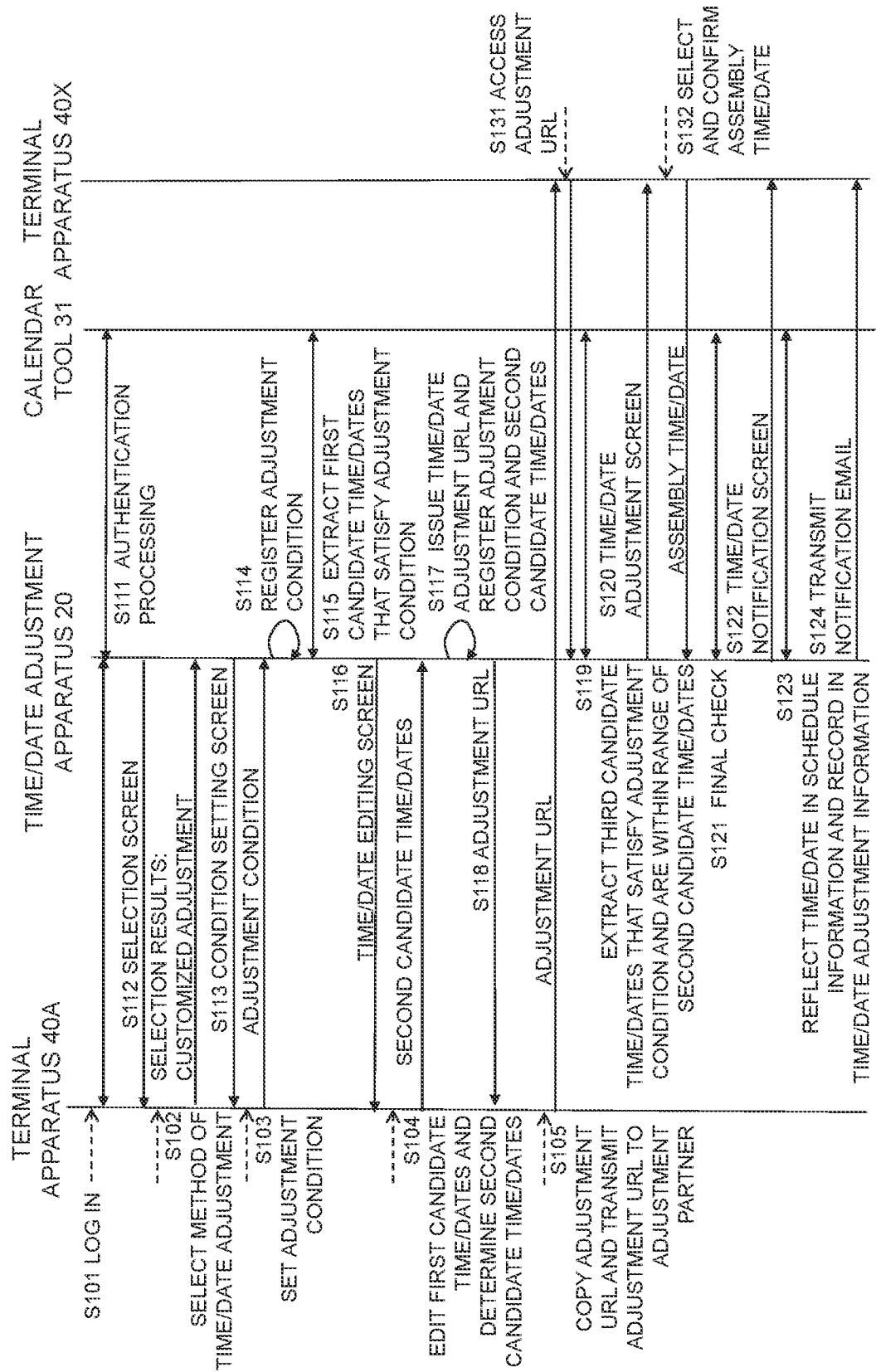
FIG. 4 is a sequence diagram for illustrating an example (customized adjustment) of time/date adjustment processing performed by the time/date adjustment system.

Next, FIG. 4 is a sequence diagram for illustrating an example of time/date adjustment processing performed by the time/date adjustment system 10.

First of all, the adjustment initiator A logs in to the time/date adjustment apparatus 20 via the network 11, using the terminal apparatus 40A (Step S101). Then, in response to the login of the adjustment initiator A, the authentication unit 211 of the time/date adjustment apparatus 20 performs the authentication processing with the external system 30, using the user account (or the user authentication information) included in the user information 222 corresponding to the adjustment initiator A stored by the storage unit 22 (Step S111).

Next, the adjustment condition setting unit 212 of the time/date adjustment apparatus 20 causes the terminal apparatus 40A to display a selection screen (not illustrated) for selecting either "customized adjustment" or "use template" as a method of time/date adjustment (Step S112). Next, on the selection screen, the adjustment initiator A selects the method of time/date adjustment (Step S102). In the present case, description will be given based on an assumption that the adjustment initiator A selects customized adjustment.

<Case in which "Customized Adjustment" Is Selected as Method of Time/Date Adjustment>

Next, the adjustment condition setting unit 212 of the time/date adjustment apparatus 20 causes the terminal apparatus 40A to display a condition setting screen 500 (FIG. 5) for setting an adjustment condition (Step S113).

FIG. 5 is a display example of the condition setting screen 500 displayed in the terminal apparatus 40A. The condition setting screen 500 is provided with an input field 510 for inputting an assembly name, a selection input field 511 for inputting time required for the assembly, a selection input field 512 for inputting time secured before and after the assembly, a selection input field 513 for inputting an extraction span of the candidate time/dates with a date, month, and year, a selection input field 514 for inputting a time frame available for the assembly, and a selection input field 515 for selecting and designating one or more meeting rooms or the like to be used for the assembly out of a site list based on the site information of the member information 221. Here, the time secured before and after the assembly is time for movement to the site, preparation work, withdrawal work, a break, and the like.

Note that, in display of the selection input fields 511 to 515, contents of the adjustment condition of the most recent assembly where the adjustment initiator A is the adjustment initiator are reflected with reference to the time/date adjustment information 224 associated with the adjustment initiator A. With this configuration, time and efforts taken by the adjustment initiator A to input the adjustment condition can be reduced. Note that whether or not to allow automatic reflection of the adjustment condition of the most recent assembly in the selection input fields 511 to 515 may be selected by designation of the adjustment initiator A. One or more patterns for adjustment conditions may be registered in advance as another piece of information, so that when one of the patterns is designated and invoked, a corresponding adjustment condition can be simply reflected. The adjustment condition (information other than the extraction span of the candidate time/dates) of the adjustment condition template information already registered may be copied, so that the adjustment condition can be simply reflected.

Furthermore, the condition setting screen 500 is provided with a selection input field 516 for selecting and designating one or more participants on the adjustment initiator A side (which may or may not include the adjustment initiator A) out of a belonging member list based on the belonging member information of the member information 221, a radio button 517 for selecting an assembly participation condition of the participant (s) designated in the selection input field 516, an input field 518 for omitting input of an email address by the adjustment partner X on a time/date confirmation screen 900 (FIG. 8), a check box 519 for selecting whether or not to register the plan of the assembly as a closed plan, and an extract candidate time/date button 520 for confirming each input item and instructing extraction of candidate time/dates of the assembly.

Note that, when a plurality of participants are designated in the selection input field 516 and all of the designated participants need to participate in the assembly, "all participants participate" may be selected in the radio button 517. When a plurality of participants are designated in the selection input field 516 and it is sufficient that at least one of the designated participants participates, "any one participant participates" may be selected in the radio button 517. When only one participant is input in the selection input field 516, "all participants participate" is automatically selected in the radio button 517, whereas when there is only one participant, subsequent operations, such as extraction of candidate time/dates, are all the same, regardless of whether "all participants participate" or "any one participant participates" is selected.

FIG. 4 is referred to again. When the adjustment initiator A inputs each item of the adjustment condition and performs operation on the extract candidate time/date button 520 on the condition setting screen 500 displayed in the terminal apparatus 40A (Step S103), in response to the operation, the adjustment condition setting unit 212 of the time/date adjustment apparatus 20 creates new time/date adjustment information 224 in association with the user information 222 of the adjustment initiator A and causes the storage unit 22 to store the time/date adjustment information 224, and registers the set adjustment condition in the time/date adjustment information 224 (Step S114).

In the present case, the following description will be given based on an assumption that, for example, as illustrated in FIG. 5, as the adjustment condition, the assembly name is set to "business discussion with Mr./Ms. XX, ABC company, concerning new product", the time required for the assembly is set to "60 minutes", the time secured before and after the assembly is each set to "30 minutes", the extraction span of the candidate time/dates is set to 8 business days from "Dec. 16, 2020" to "Dec. 25, 2020", the time frame available is set to "09:00 to 18:00", the site is set to "not designated", the input of participants is set to three persons of "A, B, and C", the assembly participation condition of the input participants is set to "all participants participate", the email address of the adjustment partner is set to "not designated", and registration of the plan of the assembly is set to "open to public".

Next, the time/date adjustment unit 213 reads the adjustment condition registered in the time/date adjustment information 224 of the adjustment initiator A from the storage unit 22, refers to the schedule information 311 of the participants managed by the calendar tool 31 of the external system 30, and extracts the first candidate time/dates that are available time/dates of the participants at the current time point and satisfy the adjustment condition (Step S115). Specifically, in the present case, time that is available time/dates common to the participants A, B, and C, a time frame from 09:00 to 18:00 on business days from December 16th, 2020 to Dec. 25, 2020, and in which 60 minutes as the time required for the assembly can be secured is extracted, and further, time in which 30 minutes as the time secured before the assembly and 30 minutes as the time secured after the assembly cannot be secured is excluded, and the first candidate time/dates are thereby determined.

Note that, when a plurality of participants are input to the selection input field 516 of the condition setting screen 500 and "all participants participate" is selected in the radio button 517, the schedule information 311 of all of the participants is referred to, and the first candidate time/dates that are available time/dates common to all of the participants and satisfy the adjustment condition are extracted. In contrast, when a plurality of participants are input to the selection input field 516 of the condition setting screen 500 and "any one participant participates" is selected in the radio button 517, the schedule information 311 of all of the participants is referred to, and the first candidate time/dates that are available time/dates of at least one of all of the participants and satisfy the adjustment condition are extracted. The same holds true for cases in which the second and third candidate time/dates are extracted, which will be described below.

Next, the time/date adjustment unit 213 causes the terminal apparatus 40A to display a time/date editing screen 600 (FIG. 6) presenting the first candidate time/dates (Step S116).

FIG. 6 illustrates a display example of the time/date editing screen 600 displayed in the terminal apparatus 40A. On the time/date editing screen 600, a candidate time/date span frame 601, a calendar 602 displayed in a grid pattern with its horizontal axis representing dates and vertical axis representing time, and a candidate time/date list 605 in which the first candidate time/dates are listed per day are displayed. On the time/date editing screen 600, an issue URL button 606 and a back button 607 are provided.

The candidate time/date span frame 601 indicates a span including the first candidate time/dates out of the extraction span of the candidate time/dates input to the selection input field 513 of the condition setting screen 500 (FIG. 5).

On the calendar 602, based on the schedule information 311 of the participants managed by the calendar tool 31, existing plan frames 604 indicating respective plans of all of the participants within a display span on the calendar 602 and first candidate time/date frames 603 are displayed in different colors or the like so that the existing plan frames 604 and the first candidate time/date frames 603 can be distinguished from each other. Note that, when there are a plurality of participants, names of the participants may be displayed in the existing plan frames 604, or the existing plan frames 604 may be assigned different colors, so as to allow making a distinction as to whose existing plan a plan is.

In the candidate time/date list 605, the first candidate time/dates are listed and displayed per day.

The adjustment initiator A can edit the first candidate time/dates, by using a pop-up screen (not illustrated) to be displayed by selecting the first candidate time/date frame 603 in the calendar 602. For example, on the pop-up screen displayed by selecting a frame of 10:30 to 15:30 on December 17th (Thursday), 10:30 being the starting time of the frame may be set to later time, and 15:30 being the ending time may be set to earlier time. A part of the frame, for example, 12:00 to 13:00, can be excluded from the first candidate time/dates. The editing results of the first candidate time/dates in the calendar 602 are reflected in the candidate time/date list 605. Note that editing of the first candidate time/dates may be performed with an operation, such as drag and drop, on the screen, depending on an operation of an input device (a mouse, a touch panel, or the like) provided for the terminal apparatus 40A. The same holds true for other screen operations in the terminal apparatuses 40A and 40X.

Note that the adjustment initiator A can edit the first candidate time/dates also in the candidate time/date list 605.

The issue URL button 606 is a button for confirming the editing results (second candidate time/dates) of the first candidate time/dates by the adjustment initiator A in the calendar 602 and instructing issuing of the adjustment URL for the adjustment partner to access the time/date adjustment screen. The back button 607 is a button for returning back to the condition setting screen 500.

In the present case, the following description will be given based on an assumption that the adjustment initiator A excludes 15:00 to 16:00 on December 16th (Wednesday) from the first candidate time/dates on the time/date editing screen 600.

FIG. 4 is referred to again. When the adjustment initiator A edits the first candidate time/dates as necessary and performs operation on the issue URL button 606 on the time/date editing screen 600 displayed in the terminal apparatus 40A (Step S104), next, the time/date adjustment unit 213 of the time/date adjustment apparatus 20 issues the adjustment URL, and registers the adjustment URL and the second candidate time/dates in the time/date adjustment information 224 (created in Step S114) corresponding to the adjustment initiator A (Step S117). Note that the second candidate time/dates may be written over the first candidate time/dates registered in the time/date adjustment information 224.

Next, the time/date adjustment unit 213 causes the terminal apparatus 40A to display the issued adjustment URL and a message for instructing transmission of the adjustment URL to the adjustment partner (Step S118).

Next, in response to the message, the adjustment initiator A copies the adjustment URL displayed in the terminal apparatus 40A, pastes the adjustment URL to an electronic mail or the like, and transmits the adjustment URL to the terminal apparatus 40X of the adjustment partner X (Step S105).

Next, when the adjustment partner X who has received the adjustment URL accesses the adjustment URL using the terminal apparatus 40X (Step S131), the time/date adjustment unit 213 of the time/date adjustment apparatus 20 reads the adjustment condition and the second candidate time/dates registered in the time/date adjustment information 224 of the adjustment initiator A corresponding to the adjustment URL from the storage unit 22, refers to the schedule information 311 of the participants managed by the calendar tool 31, and extracts the third candidate time/dates that are available time/dates of the participants at the current time point, satisfy the adjustment condition, and are within a range of the second candidate time/dates (Step S119).

In the present case, it is assumed that a plan at 13:00 to 14:00 on December 17th (Thursday) is added to the schedule information 311 of the adjustment initiator A being a participant during time from when the adjustment URL is issued to when the adjustment partner X accesses the adjustment URL. In this case, the third candidate time/dates are those obtained by excluding, from the second candidate time/dates, 12:30 to 14:30 on December 17th (Thursday) with "30 minutes" as the time secured before and after the assembly being taken into consideration. In other words, the "time secured before and after" of the adjustment condition is also applied to the additional plan of the adjustment initiator A.

Next, the time/date adjustment unit 213 causes the terminal apparatus 40X to display a time/date adjustment screen 800 (FIG. 7) (Step S120).

Figure 7:
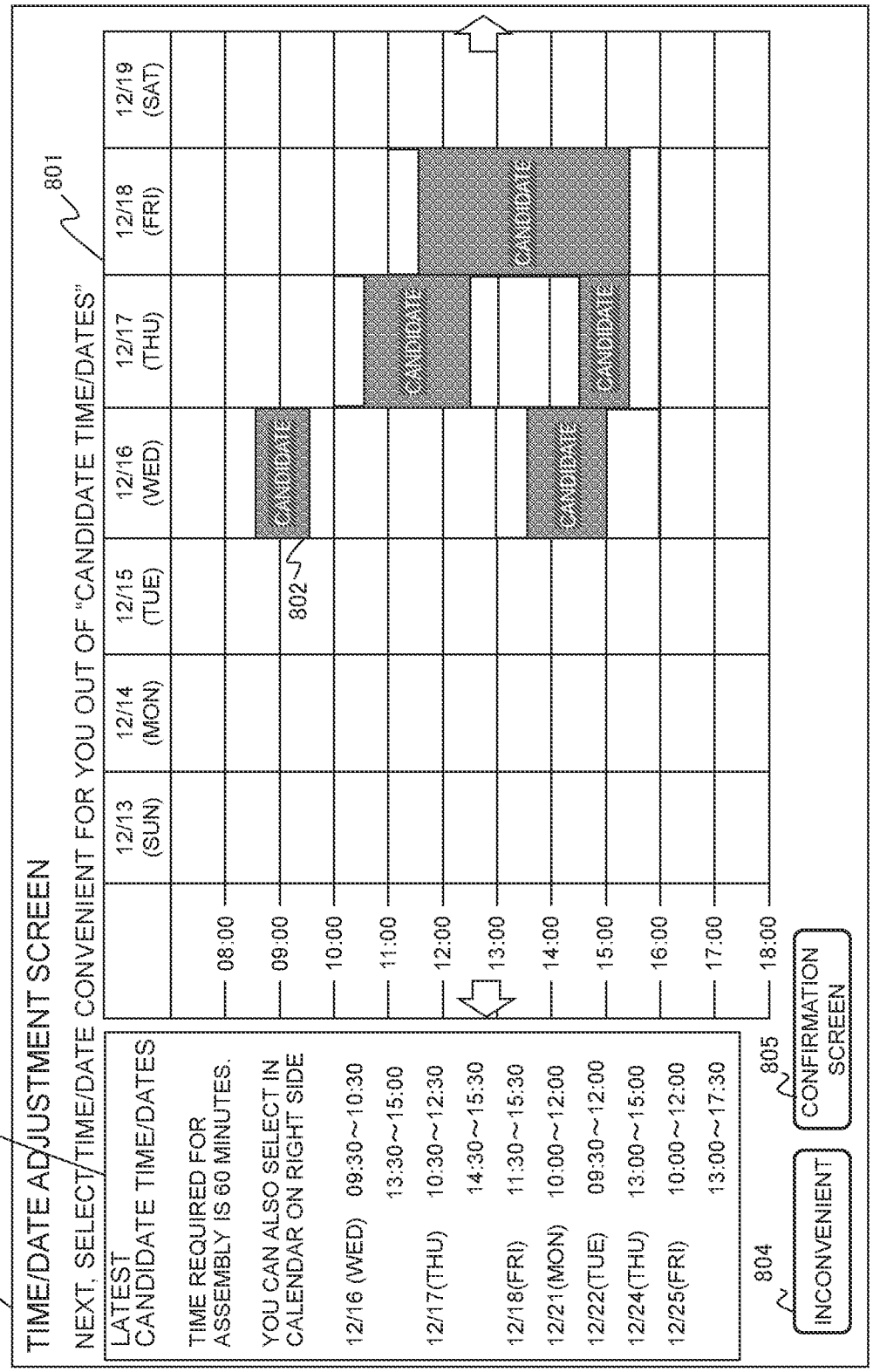
FIG. 7 is a diagram illustrating a display example of a time/date adjustment screen.

FIG. 7 illustrates a display example of the time/date adjustment screen 800. On the time/date adjustment screen 800, a calendar 801 displayed in a grid pattern with its horizontal axis representing dates and vertical axis representing time and a candidate time/date list 803 in which the third candidate time/dates are listed per day are displayed. On the time/date adjustment screen 800, an inconvenient button 804 and a confirmation screen button 805 are provided.

In the calendar 801, third candidate time/date frames 802 are displayed in different colors or the like so that the third candidate time/date frames 802 can be distinguished from other frames. Note that, in the calendar 801, existing plans of the participant are not displayed, unlike the calendar 602 of the time/date editing screen 600 (FIG. 6). Thus, for the adjustment partner X, privacy of the participant can be protected.

In the candidate time/date list 803, the time required for the assembly and the third candidate time/dates listed per day are displayed.

The adjustment partner X can select the assembly time/date by selecting one of the third candidate time/date frames 802 in the calendar 801. Note that, when a frame longer than "60 minutes" as the time required for the assembly is selected, a pop-up screen (not illustrated) is displayed. The adjustment partner X can determine the assembly time/date by selecting "60 minutes" as the time required within time of the selected frame on the pop-up screen.

In the present case, the following description will be given based on an assumption that the adjustment partner X determines 11:00 to 12:00 on December 17th (Thursday) as the assembly time/date on the time/date adjustment screen 800.

The inconvenient button 804 is a button on which operation is performed when the third candidate time/dates presented on the time/date adjustment screen 800 are inconvenient. When the adjustment partner X performs operation on the inconvenient button 804, the adjustment initiator A is notified that suggested candidate time/dates are inconvenient. In this case, the adjustment initiator A changes the adjustment condition, and executes the time/date adjustment processing again.

The confirmation screen button 805 is a button for checking with the determined assembly time/date. When the adjustment partner X performs operation on the confirmation screen button 805, the time/date confirmation screen 900 (FIG. 8) for the adjustment partner X themselves to confirm with the assembly time/date selected and determined out of the third candidate time/dates is displayed in the terminal apparatus 40X.

FIG. 8 illustrates a display example of the time/date confirmation screen 900. On the time/date confirmation screen 900, a calendar 901 displayed in a grid pattern with its horizontal axis representing dates and vertical axis representing time and an assembly detail 903 are displayed.

In the calendar 901, an assembly time/date frame 902 selected and determined on the time/date adjustment screen 800 (FIG. 7) by the adjustment partner X themselves is displayed in different colors or the like so that the assembly time/date frame 902 can be distinguished from other frames. In the assembly detail 903, the selected and determined assembly time/date (in the present case, 11:00 to 12:00 on December 17th (Thursday)) is displayed.

The time/date confirmation screen 900 is provided with an input field 904 for the adjustment partner X to input an email address of the adjustment partner X, a check box 905 for setting a timing of transmitting a notification email for giving notification of holding of the assembly for the adjustment partner X, a back button 906 for returning back to the time/date adjustment screen 800, and a confirm button 907 for confirming the contents displayed on the time/date confirmation screen 900.

FIG. 4 is referred to again. When the adjustment partner X inputs the email address of the adjustment partner X to the input field 904 and performs operation on the confirm button 907 on the time/date confirmation screen 900 (FIG. 8) displayed in the terminal apparatus 40X (Step S132), the time/date adjustment unit 213 refers to the schedule information 311 of the participant managed by the calendar tool 31, and performs final check that the assembly time/date confirmed on the time/date confirmation screen 900 is an available time/date of the participant at the current time point, satisfies the adjustment condition, and is within a range of the second candidate time/dates (Step S121). Here, when the confirmed assembly time/date is no longer an available time/date of the participant or no longer satisfies the adjustment condition, for example, a message such as "The designated time has been occupied. Select again" may be displayed on the terminal apparatus 40X, and the processing may be brought back to Step S119 and may resume from the operation of the adjustment partner X on the time/date adjustment screen 800. In contrast, when final check is successfully performed that the confirmed assembly time/date is an available time/date of the participant, satisfies the adjustment condition, and is within a range of the second candidate time/dates, a time/date notification screen 1000 (FIG. 9) presenting the time/date of the assembly and the like confirmed by the adjustment partner X themselves is displayed in the terminal apparatus 40X (Step S122).

Figure 9:
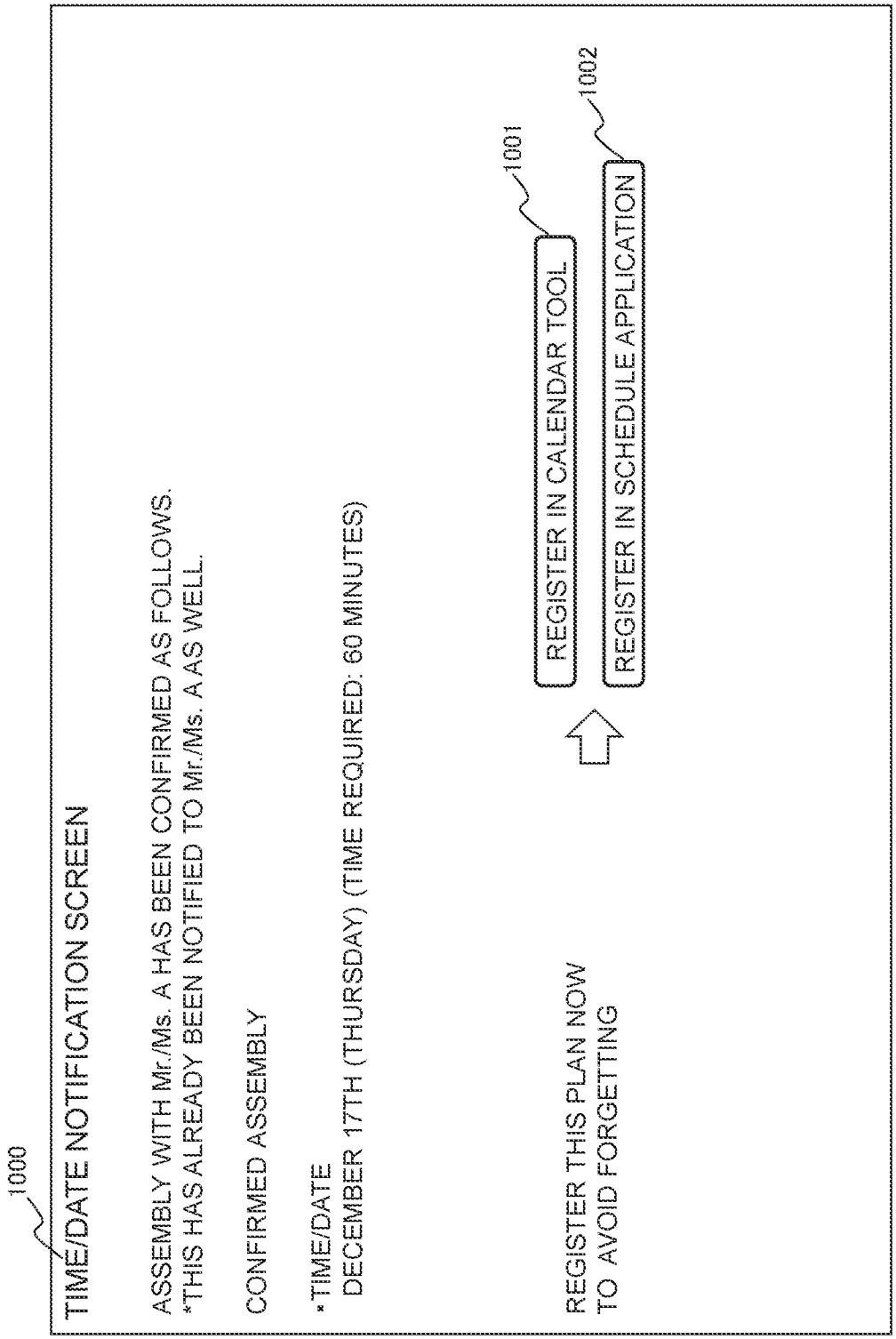
FIG. 9 is a diagram illustrating a display example of a time/date notification screen.

FIG. 9 illustrates a display example of the time/date notification screen 1000. On the time/date notification screen 1000, the confirmed time/date of the assembly and the like are displayed. On the time/date notification screen 1000, a register button 1001 for the calendar tool and a register button 1002 for a schedule application are provided. When the adjustment partner X uses the calendar tool 31 and performs operation on the register button 1001, the adjustment partner X can register the plan of the confirmed assembly in the calendar tool 31 as a plan of the adjustment partner X themselves. When the adjustment partner X performs operation on the register button 1002, the adjustment partner X can register the plan of the confirmed assembly in an application program (for example, Outlook (trademark) or the like) for schedule management used by the adjustment partner X.

FIG. 4 is referred to again. When final check is successfully performed that the confirmed assembly time/date is an available time/date of the participant, satisfies the adjustment condition, and is within a range of the second candidate time/dates in the final check of Step S121, the time/date adjustment unit 213 registers the plan of the assembly with the adjustment partner X in the schedule information 311 of the participant managed by the calendar tool 31. The time/date adjustment unit 213 registers the email address of the adjustment partner X, the timing of transmitting the notification email, and the date and time of the assembly in the time/date adjustment information 224 (created in Step S114) corresponding to the adjustment initiator A, stored in the storage unit 22 (Step S123).

In the present case, the participants A, B, and C are designated as the participants in the selection input field 516 of the condition setting screen 500 (FIG. 5) and "all participants participate" is selected in the radio button 517, and thus the time/date adjustment unit 213 registers the plan of the assembly with the adjustment partner X in the schedule information 311 of each of the participants A, B, and C managed by the calendar tool 31. In contrast, when "any one participant participates" is selected in the radio button 517, the plan of the assembly with the adjustment partner X may be registered in the schedule information 311 of all of the persons having an available time/date on the confirmed assembly time/date out of the participants A, B, and C input to the selection input field 516, or one person may be selected out of persons having an available time/date on the confirmed assembly time/date and the plan of the assembly with the adjustment partner X may be registered in the schedule information 311 of the one selected person. Note that, regarding selection of the participant, the time/date adjustment unit 213 may perform selection in accordance with a predetermined rule, or the adjustment initiator A may perform selection.

Next, the time/date adjustment unit 213 transmits the notification email for notifying the adjustment partner X of holding of the assembly to the email address designated by the adjustment partner X, in accordance with the timing of transmission selected by the adjustment partner X themselves (Step S124).

Note that, in the present embodiment, an arrow from the time/date adjustment apparatus 20 to the terminal apparatus 40X is illustrated as Step S124, on the assumption that the adjustment partner X receives the electronic mail using the terminal apparatus 40X; however, the adjustment partner X may receive the notification email from the time/date adjustment apparatus 20, using an electronic device other than the terminal apparatus 40X. Through the above processing, the time/date adjustment processing performed by the time/date adjustment system 10 ends.

Note that, in the present case, the adjustment initiator A does not designate a site of the assembly; however, when the adjustment initiator A designates a site in the selection input field 515 of the condition setting screen 500 (FIG. 5), the first candidate time/dates and the third candidate time/dates may be extracted such that available time/dates of the site are satisfied as well.

Specifically, for example, when only "first meeting room" is designated as the site, in Step S115, the time/date adjustment unit 213 may read the adjustment condition registered in the time/date adjustment information 224 of the adjustment initiator A from the storage unit 22, refer to the schedule information 311 of the participants and the first meeting room managed by the calendar tool 31 of the external system 30, and extract the first candidate time/dates that are available time/dates common to the participants and the first meeting room at the current time point and satisfy the adjustment condition. In Step S119, the time/date adjustment unit 213 may read the adjustment condition and the second candidate time/dates registered in the time/date adjustment information 224 of the adjustment initiator A corresponding to the accessed adjustment URL from the storage unit 22, refer to the schedule information 311 of the participants and the first meeting room managed by the calendar tool 31, and extract the third candidate time/dates that are available time/dates common to the participants and the meeting room at the current time point, satisfy the adjustment condition, and are within a range of the second candidate time/dates. Moreover, in Step S123, the time/date adjustment unit 213 may register the plan of the assembly with the adjustment partner X in the schedule information 311 of each of the participants and the first meeting room managed by the calendar tool 31.

For example, when two rooms of "first meeting room and second meeting room" are designated as the site, in Step S115, the time/date adjustment unit 213 may read the adjustment condition registered in the time/date adjustment information 224 of the adjustment initiator A from the storage unit 22, refer to the schedule information 311 of the participants, the first meeting room, and the second meeting room managed by the calendar tool 31 of the external system 30, and extract the first candidate time/dates that are available time/dates of the participants, available time/dates of at least one room of the first meeting room and the second meeting room, and satisfy the adjustment condition, at the current time point. In Step S119, the time/date adjustment unit 213 may read the adjustment condition and the second candidate time/dates registered in the time/date adjustment information 224 of the adjustment initiator A corresponding to the accessed adjustment URL from the storage unit 22, refer to the schedule information 311 of the participants, the first meeting room, and the second meeting room managed by the calendar tool 31, and extract the third candidate time/dates that are available time/dates of the participants, available time/dates of at least one room of the first meeting room and the second meeting room, satisfy the adjustment condition, and are within a range of the second candidate time/dates, at the current time point. Moreover, when two rooms of the first meeting room and the second meeting room are available on the confirmed assembly time/date, one room of the first meeting room and the second meeting room is selected, and the plan of the assembly with the adjustment partner X is registered in the schedule information 311 of the selected site. Note that, regarding selection of the site, the time/date adjustment unit 213 may perform selection in accordance with a predetermined rule, or the adjustment initiator A may perform selection. Then, in Step S123, the time/date adjustment unit 213 may register the plan of the assembly with the adjustment partner X in the schedule information 311 of each of the participants and the selected site managed by the calendar tool 31.

According to the time/date adjustment processing described above, the adjustment initiator A who has logged in to the time/date adjustment apparatus 20 by using the user account freely designates one or more participants out of the belonging member list of the organization to which the adjustment initiator A belongs, and further freely designates one or more sites out of the site list available to the belonging members of the organization to which the adjustment initiator A belongs, and therefore the time/date of the assembly with the adjustment partner X can be easily and efficiently set without causing a double booking.

According to the time/date adjustment processing, the confirmed time/date of the assembly and the like can be registered in the calendar tool 31 used by the participant. Therefore, time and efforts for conventionally required manual registration of the schedule in the calendar tool 31 can be eliminated.

In addition, from the standpoint of the adjustment initiator A, operations from extraction of the candidate time/dates to transmission of the candidate time/dates to the adjustment partner X can be performed in a short period of time (for example, approximately 30 seconds), and after transmitting the candidate time/dates to the adjustment partner X, the adjustment initiator A only has to wait and can have important operations regarding time/date adjustment automatically completed, including not only determination of the time/date but also securing of the site and registration of the plan. This can significantly reduce time and efforts for the operations regarding time/date adjustment.

<Case in which "Use Template" is Selected as Method of Time/Date Adjustment>

Next, a case in which the adjustment initiator A selects "use template" as the method of time/date adjustment will be described. In a case of "use template", the adjustment condition template created by the adjustment initiator A themselves in advance is selected, and the adjustment URL designated by the adjustment initiator A themselves in advance is copied, and the adjustment URL can be thereby more promptly transmitted to the adjustment partner X, in comparison to customized adjustment. Note that the adjustment condition template created by the adjustment initiator A in advance may be designated and edited by another user, and the adjustment URL may be copied and used for time/date adjustment.

A user such as the adjustment initiator A can create the adjustment condition templates in advance, depending on a purpose of the assembly, such as "for a first interview for recruitment of a new graduate", "for a second interview for recruitment of a new graduate", "for a final interview for recruitment of a new graduate", and "for sales for an inquiry", for example.

Note that, in a case of "customized adjustment", the adjustment condition is set every time adjustment of a time/date of an assembly is performed; however, the adjustment condition template can be repeatedly used for adjustment of time/dates of different assemblies again and again.

<Adjustment Condition Template Creation Processing>

Figure 10:
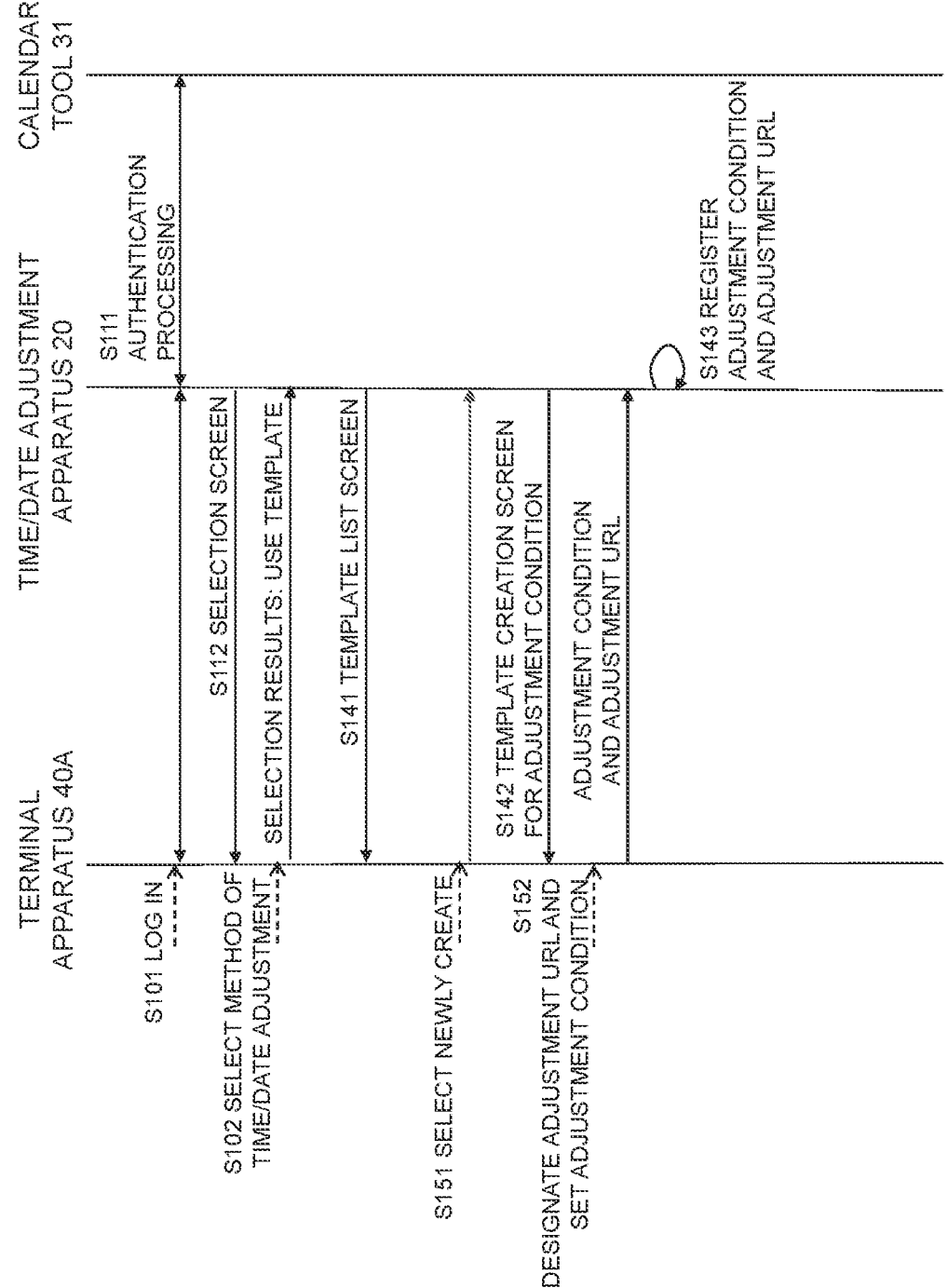
FIG. 10 is a sequence diagram for illustrating an example of adjustment condition template creation processing.

Next, FIG. 10 is a sequence diagram for illustrating an example of adjustment condition template creation processing.

The adjustment condition template creation processing includes Steps S101, S111, S112, and S102 similar to those of the time/date adjustment processing illustrated in FIG. 4. Then, when the adjustment initiator A selects "use template" as the method of time/date adjustment in Step S102, next, the adjustment condition setting unit 212 of the time/date adjustment apparatus 20 refers to the adjustment condition template information 223 associated with the user information 222 corresponding to the adjustment initiator A, and causes the terminal apparatus 40A to display a template list screen 1100 (FIG. 11) presenting a list of adjustment condition templates available to the adjustment initiator A (Step S141).

FIG. 11 illustrates a display example of the template list screen 1100 displayed in the terminal apparatus 40A.

The template list screen 1100 is provided with a newly create button 1101 and a template list 1102 presenting a list of adjustment condition templates available to the adjustment initiator A. In the template list 1102, a name for management, a description, an adjustment URL, an edit button 1103, and a URL copy button 1104 are displayed for each template.

The newly create button 1101 is a button for instructing proceeding to a template creation screen 1200 (FIG. 12 and FIG. 13), on which a new adjustment condition template can be created. The edit button 1103 is a button for instructing proceeding to a screen (not illustrated; similar to the template creation screen 1200), on which a created adjustment condition template can be edited. The URL copy button 1104 is a button for instructing copying of the adjustment URL.

FIG. 10 is referred to again. When the adjustment initiator A performs operation on the newly create button 1101 on the template list screen 1100 displayed in the terminal apparatus 40A (Step S151), next, the adjustment condition setting unit 212 causes the terminal apparatus 40A to display the template creation screen 1200 (Step S142).

Figure 13:
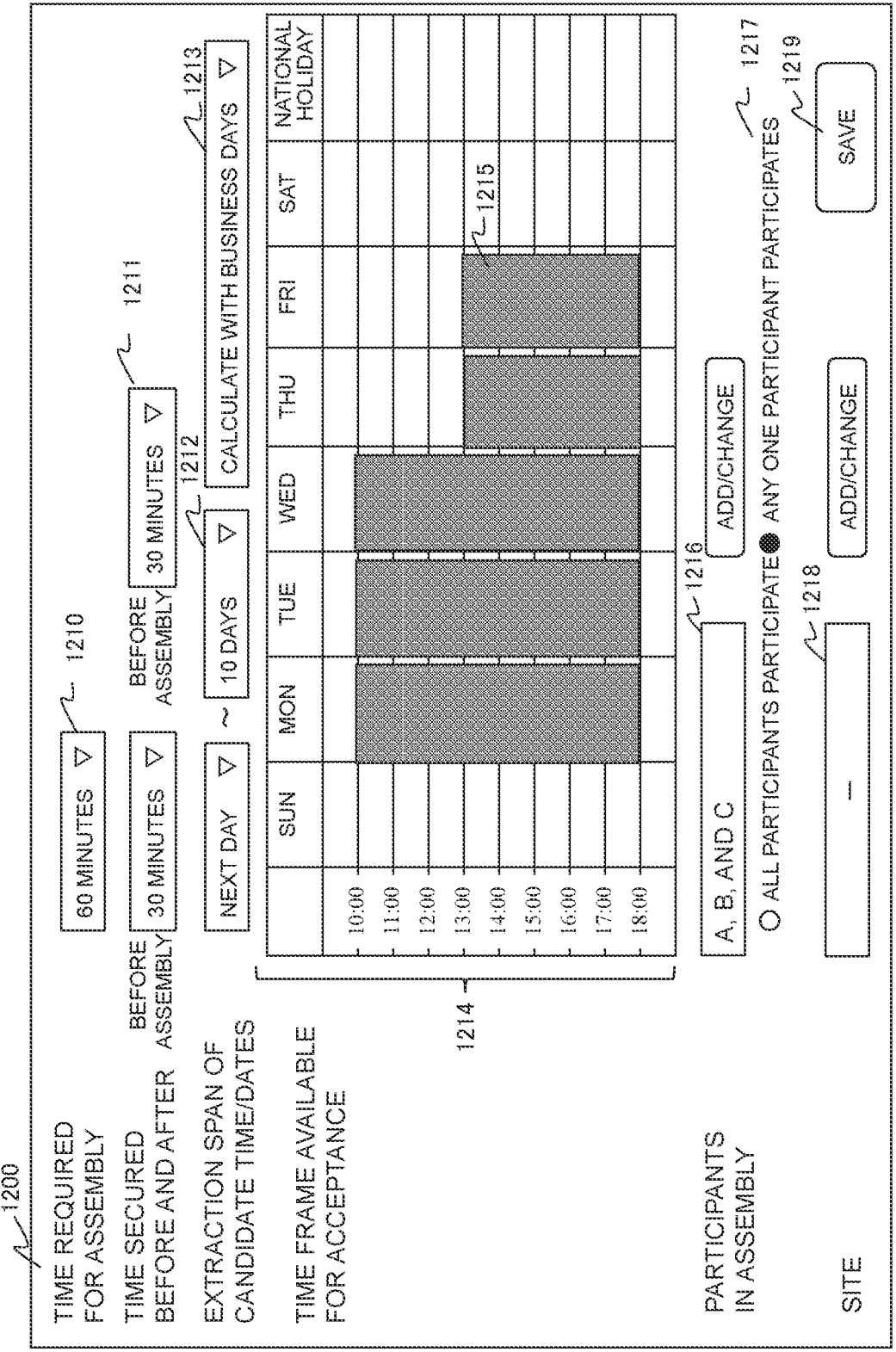
FIG. 13 is a diagram illustrating a display example of the template creation screen.

FIG. 12 and FIG. 13 illustrate display examples of the template creation screen 1200. FIG. 12 illustrates an upper part of the template creation screen 1200, and FIG. 13 illustrates a lower part of the template creation screen 1200, which is displayed by scrolling down the upper part illustrated in FIG. 12.

As illustrated in FIG. 12, the template creation screen 1200 is provided with an input field 1201 for inputting a name for management of the template, an input field 1202 for inputting a description of the template, an input field 1203 for the user to designate an adjustment URL, a check box 1204 for designating a company name/school name, a name, and an email address as input items of the adjustment partner X, and an input field 1205 for inputting a topic of the plan to be used in registration in the calendar tool 31 after the time/date is confirmed.

As illustrated in FIG. 13, the template creation screen 1200 is further provided with a selection input field 1210 for inputting the time required for the assembly, a selection input field 1211 for inputting the time secured before and after the assembly, a selection input field 1212 for inputting the extraction span of the candidate time/dates, a selection input field 1213 for selecting and inputting a method of calculating the number of days to be extracted for the extraction span (for example, calculation with business days, calculation with calendar days, or the like), an input field 1214 for designating a time frame available for the assembly for each day of the week and national holiday (a frame 1215 denotes a time frame designated as the time frame available for the assembly), a selection input field 1216 for selecting and designating one or more participants (which may or may not include the adjustment initiator A) out of the belonging member list based on the belonging member information of the member information 221, a radio button 1217 for selecting the assembly participation condition of the participant (s) designated in the selection input field 1216, a selection input field 1218 for selecting and designating one or more sites to be used for the assembly out of the site list based on the site information of the member information 221, and a save button 1219 for instructing saving of the input contents.

Note that, in the selection input field 1212 for inputting the extraction span of the candidate time/dates on the template creation screen 1200, start timing (in the case of the figure, next day) of the extraction span from the date and time on which the adjustment partner performs access based on the adjustment URL and a span (in the case of the figure, 10 days) from the start timing can be designated in order to provide versatility, unlike the selection input field 513 of a similar purpose provided on the condition setting screen 500 (FIG. 5) corresponding to customized adjustment where a specific date, month, and year are selected. Thus, the adjustment condition template can be repeatedly used for adjustment of time/dates of different assemblies again and again.

FIG. 10 is referred to again. When the adjustment initiator A finishes inputting each item of the adjustment condition and then performs operation on the save button 1219 on the template creation screen 1200 displayed in the terminal apparatus 40A (Step S152), next, the adjustment condition setting unit 212 creates the adjustment condition template information 223, registers the adjustment condition and the adjustment URL set on the template creation screen 1200, and records the adjustment condition template information 223 in the storage unit 22 in association with the user information 222 of the adjustment initiator A (Step S143). Through the above processing, the processing of creating the adjustment condition template ends.

<Time/Date Adjustment Processing Using Adjustment Condition Template>

Figure 14:
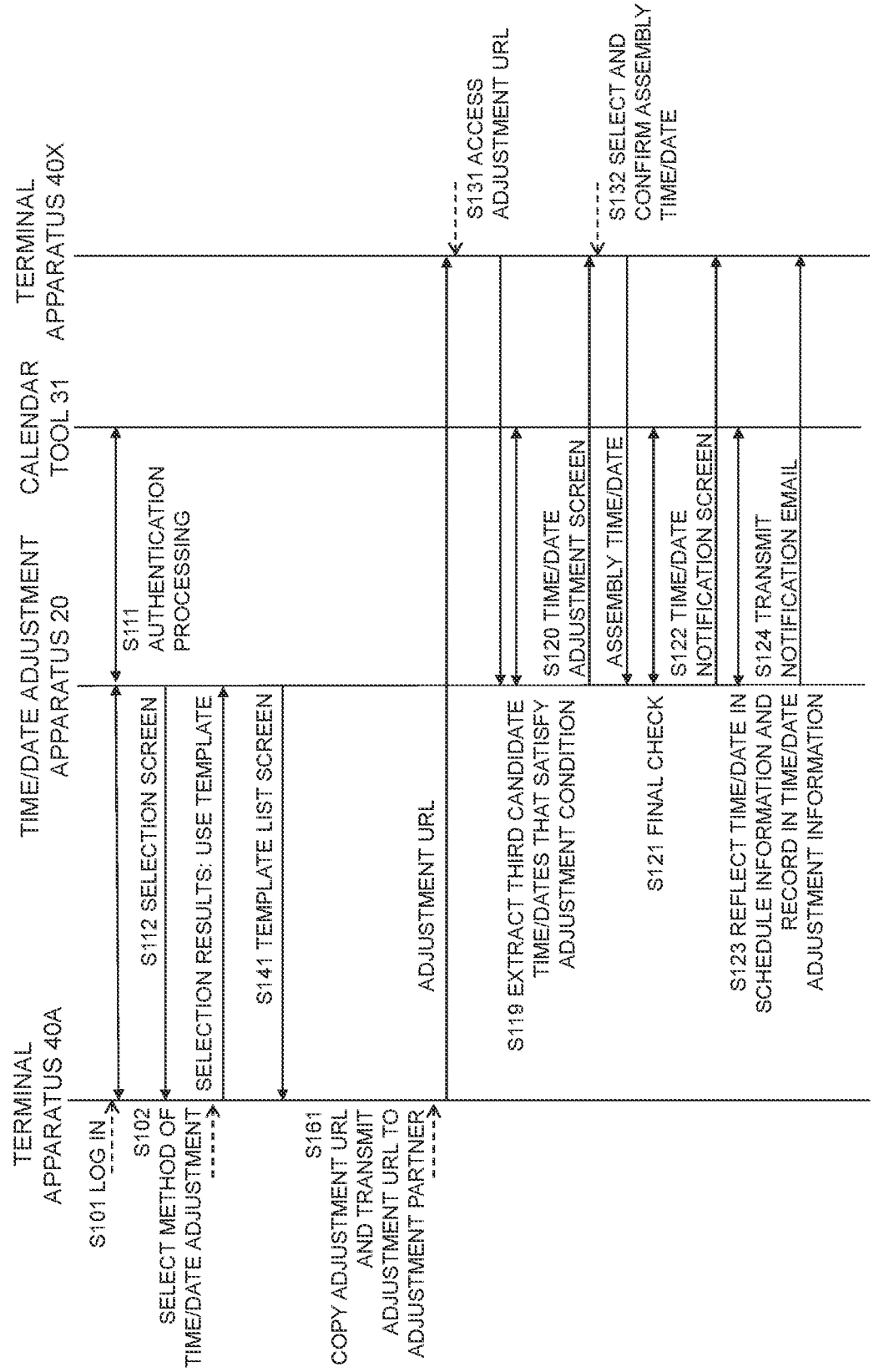
FIG. 14 is a sequence diagram for illustrating another example (use of an adjustment condition template) of the time/date adjustment processing performed by the time/date adjustment system.

Next, FIG. 14 is a sequence diagram for illustrating another example of the time/date adjustment processing using the adjustment condition template.

Such another example includes Steps S101, S111, S112, S102, and S141 similar to those of the adjustment condition template creation processing illustrated in FIG. 10. Then, in Step S141, on the template list screen 1100 (FIG. 11) displayed in the terminal apparatus 40A, the adjustment initiator A selects one of the templates, performs operation on the URL copy button 1104 to copy the adjustment URL, pastes the adjustment URL to an electronic mail or the like, and transmits the adjustment URL to the terminal apparatus 40X of the adjustment partner X (Step S161).

The following processing is similar to the time/date adjustment processing of FIG. 4, and thus description thereof will be omitted. Note that, in the present case, in Step S119, because the second candidate time/dates are not present, the third candidate time/dates that are the available time/dates of the participants at the current time point and satisfy the adjustment condition may be extracted. In the present case, the time/date confirmation screen 900 (FIG. 8) displayed in Step S132 is provided with input fields corresponding to the items selected in the check box 1204 as the input items of the adjustment partner on the template creation screen 1200 (FIG. 12) (an input field for inputting a company name/school name, an input field for inputting a name), instead of or in addition to the input field 904 for inputting an email address. Moreover, in the present case, in Step S123, the topic of the plan to be registered in the schedule information 311 of the participants can be generated by combining fixed text and the company name/school name, the name, and the like input by the adjustment partner X in the input fields corresponding to the items selected in the check box 1204.

According to another example of the time/date adjustment processing described above (a case of selecting use of the adjustment condition template), in addition to effects similar to those of the time/date adjustment processing of FIG. 4 (a case of selecting customized adjustment), the adjustment initiator A merely selects the adjustment condition template and transmits the adjustment URL as their operation, and therefore time and efforts taken by the adjustment initiator A can be significantly reduced, in comparison to the case of customized adjustment.

In addition, in time/date adjustment in business, a pattern of the participants, the site, the time frame, and the like is, to a certain degree, determined for each situation (type of assembly), such as an interview, a sales visit, having a visitor, and a web meeting. Thus, once the adjustment condition template for each situation is created and registered in advance, by merely selecting the template, the adjustment URL can be instantly transmitted to the adjustment partner X.

Because the adjustment condition template can be repeatedly used and the adjustment URL corresponding to each adjustment condition template is fixed, for example, by attaching a link of the adjustment URL subsequently to an inquiry form of a website of a company, time/date adjustment can be performed without the time and efforts taken to transmit the adjustment URL to the adjustment partner X.

By attaching the adjustment URL to an email for simultaneous distribution or the like, the adjustment URL can be simultaneously transmitted to a plurality of adjustment partners X.

Typically, for example, the time/date adjustment apparatus of the present embodiment can prepare various operation screens as web pages, and can display such operation screens in a web browser of the terminal apparatus. However, this aspect is not restrictive. For example, a dedicated application including various operation screens may be installed in the terminal apparatus. In this case, by transmitting a part of contents (data such as candidate time/dates) to be displayed on various operation screens to the terminal apparatus, the time/date adjustment apparatus can cause the dedicated application of the terminal apparatus to display various operation screens. In other words, the time/date adjustment apparatus of the present invention may also encompass various aspects in which screens can be displayed in the terminal apparatus.

The present invention is not limited to the embodiments and modifications described above, and further various modifications can be made. For example, the embodiments and the modifications described above are described in detail in order to give simple description of the present invention, and are not necessarily limited to those including all of the configurations described above. A part of one modification may be replaced with another modification, or modifications may be combined together.

A part or all of each configuration, function, processing unit, processing means, and the like described above may be, for example, implemented with hardware by designing those with an integrated circuit, for example. Each configuration, function, and the like described above may be implemented with software by a processor interpreting and executing a program for implementing their respective functions. Information such as a program, a table, and a file for implementing respective functions may be stored in a recording apparatus such as a memory, a hard disk, and an SSD, or a recording medium such as an IC card, an SD card, and a DVD. Illustrated control lines and information lines are those considered to be necessary for the sake of description, and not necessarily all of control lines and information lines for a product are illustrated. It may be considered that most of the configurations are connected to each other in actuality.

REFERENCE SIGNS LIST

10 . . . Time/date adjustment system
11 . . . Network
20 . . . Time/date adjustment apparatus
21 . . . Processing unit 211 . . . Authentication unit
212 . . . Adjustment condition setting unit
213 . . . Time/date adjustment unit
22 . . . Storage unit
221 . . . Member information
222 . . . User information
223 . . . Adjustment condition template information
224 . . . Time/date adjustment information
23 . . . Communication unit
30 . . . External system
31 . . . Calendar tool
311 . . . Schedule information
40A, 40M, 40X . . . Terminal apparatus
500 . . . Condition setting screen
600 . . . Time/date editing screen
800 . . . Time/date adjustment screen
900 . . . Time/date confirmation screen
1000 . . . Time/date notification screen
1100 . . . Template list screen
1200 . . . Template creation screen

The invention claimed is:

1. A time/date adjustment apparatus comprising:
an authentication unit configured to perform authentication processing with an external system managing schedule information of a belonging member belonging to an organization being a member of the time/date adjustment apparatus;
an adjustment condition setting unit configured to set an adjustment condition related to an assembly; and
a time/date adjustment unit configured to adjust an assembly time/date based on the adjustment condition, wherein
the authentication unit performs first authentication processing with the external system, by using an administrator privilege account of the external system,
after the first authentication processing succeeds, the authentication unit acquires belonging member information managed by the external system from the external system by using the administrator privilege account, the belonging member information including information that is not allowed to be acquired using an account not having an administrator privilege of the external system,
the adjustment condition setting unit sets the adjustment condition including a participant in the assembly selected out of a belonging member list based on the belonging member information, based on an input of an adjustment initiator being the belonging member of the organization and a user of the time/date adjustment apparatus,
when an adjustment partner performs access based on access information, the time/date adjustment unit refers to the schedule information of the participant managed by the external system, and extracts candidate time/dates that are available time/dates of the participant satisfying the adjustment condition,
the time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen, and
the time/date adjustment unit registers the determined assembly time/date in the schedule information of the participant managed by the external system.

2. The time/date adjustment apparatus according to claim 1, wherein the authentication unit associates the adjustment initiator with the belonging member information as the user of the time/date adjustment apparatus, when the adjustment initiator logs in to the time/date adjustment apparatus for first time using a user account of the adjustment initiator for the external system, the authentication unit performs second authentication processing with the external system by using the user account used in the login by the adjustment initiator, the second authentication processing succeeds, and it is confirmed that the user account used in the login by the adjustment initiator is included in the belonging member information acquired from the external system.

3. The time/date adjustment apparatus according to claim 1, wherein
the adjustment condition setting unit causes a first terminal apparatus used by the adjustment initiator to display a condition setting screen for setting the adjustment condition, and sets the adjustment condition based on the input of the adjustment initiator on the condition setting screen,
the time/date adjustment unit refers to the schedule information of the participant managed by the external system, and extracts available time/dates of the participant satisfying the adjustment condition as first candidate time/dates,
the time/date adjustment unit causes the first terminal apparatus to display a time/date editing screen for editing the extracted first candidate time/dates, and determines second candidate time/dates edited based on the input of the adjustment initiator on the time/date editing screen,
the time/date adjustment unit issues the access information for the time/date adjustment screen,
when the second terminal apparatus used by the adjustment partner performs access based on the access information, the time/date adjustment unit refers to the schedule information of the participant, and extracts third candidate time/dates that are available time/dates of the participant satisfying the adjustment condition and are within a range of the second candidate time/dates,
the time/date adjustment unit causes the second terminal apparatus to display the time/date adjustment screen presenting the extracted third candidate time/dates, and determines the assembly time/date out of the extracted third candidate time/dates based on the selection operation of the adjustment partner on the time/date adjustment screen, and
the time/date adjustment unit registers the determined assembly time/date in the schedule information of the participant managed by the external system.

4. The time/date adjustment apparatus according to claim 1, wherein
the participant is the adjustment initiator themselves, or the belonging member belonging to the organization same as the adjustment initiator, the belonging member being other than the adjustment initiator.

5. The time/date adjustment apparatus according to claim 1, wherein
when a plurality of the participants are designated as the adjustment condition, based on the adjustment partner performing access based on the access information, the time/date adjustment unit refers to the schedule information of all of the plurality of the participants managed by the external system, and extracts the candidate time/dates that are the available time/dates common to all of the plurality of the participants satisfying the adjustment condition.

6. The time/date adjustment apparatus according to claim 1, wherein
when a plurality of the participants are designated as the adjustment condition, based on the adjustment partner performing access based on the access information, the time/date adjustment unit refers to the schedule information of all of the plurality of the participants managed by the external system, and extracts the candidate time/dates that are the available time/dates of at least one of all of the plurality of the participants satisfying the adjustment condition.

7. A time/date adjustment apparatus comprising:
an authentication unit configured to perform authentication processing with an external system managing schedule information of a site to be used for an assembly by a belonging member belonging to an organization being a member of the time/date adjustment apparatus;
an adjustment condition setting unit configured to set an adjustment condition related to the assembly; and
a time/date adjustment unit configured to adjust an assembly time/date based on the adjustment condition, wherein
the authentication unit performs first authentication processing with the external system, by using an administrator privilege account of the external system,
after the first authentication processing succeeds, the authentication unit acquires site information managed by the external system from the external system by using the administrator privilege account, the site information including information that is not allowed to be acquired using an account not having an administrator privilege of the external system,
the adjustment condition setting unit sets the adjustment condition including a selected site selected out of a site list based on the site information, based on an input of an adjustment initiator being the belonging member of the organization and a user of the time/date adjustment apparatus,
when an adjustment partner performs access based on access information, the time/date adjustment unit refers to the schedule information of the selected site managed by the external system, and extracts candidate time/dates that are available time/dates of the selected site satisfying the adjustment condition,
the time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen, and
the time/date adjustment unit registers the determined assembly time/date in the schedule information of the selected site managed by the external system.

8. The time/date adjustment apparatus according to claim 7, wherein
the adjustment condition setting unit sets the adjustment condition including a plurality of the selected sites selected out of the site list based on the site information, based on the input of the adjustment initiator,
when the adjustment partner performs access based on the access information, the time/date adjustment unit refers to the schedule information of the plurality of the selected sites managed by the external system, and extracts the candidate time/dates that are the available time/dates of at least one site of the plurality of the selected sites satisfying the adjustment condition,
the time/date adjustment unit causes the second terminal apparatus used by the adjustment partner to display the time/date adjustment screen presenting the extracted candidate time/dates, and determines the assembly time/date out of the extracted candidate time/dates, based on the selection operation of the adjustment partner on the time/date adjustment screen, and
the time/date adjustment unit registers the determined assembly time/date in the schedule information of the selected site having the available time/date on the determined assembly time/date out of the plurality of the selected sites, the schedule information being managed by the external system.

9. The time/date adjustment apparatus according to claim 7, wherein
the adjustment condition setting unit causes a first terminal apparatus used by the adjustment initiator to display a condition setting screen for setting the adjustment condition, and sets the adjustment condition based on the input of the adjustment initiator on the condition setting screen,
the time/date adjustment unit refers to the schedule information of the selected site managed by the external system, and extracts available time/dates of the selected site satisfying the adjustment condition as first candidate time/dates,
the time/date adjustment unit causes the first terminal apparatus to display a time/date editing screen for editing the extracted first candidate time/dates, and determines second candidate time/dates edited based on the input of the adjustment initiator on the time/date editing screen,
the time/date adjustment unit issues the access information for the time/date adjustment screen,
when the second terminal apparatus used by the adjustment partner performs access based on the access information, the time/date adjustment unit refers to the schedule information of the selected site, and extracts third candidate time/dates that are available time/dates of the selected site satisfying the adjustment condition and are within a range of the second candidate time/dates,
the time/date adjustment unit causes the second terminal apparatus to display the time/date adjustment screen presenting the extracted third candidate time/dates, and determines the assembly time/date out of the extracted third candidate time/dates based on the selection operation of the adjustment partner on the time/date adjustment screen, and
the time/date adjustment unit registers the determined assembly time/date in the schedule information of the selected site managed by the external system.

10. The time/date adjustment apparatus according to claim 1, wherein
the adjustment condition setting unit causes a first terminal apparatus used by the adjustment initiator to display a template creation screen for creating an adjustment condition template, and
the adjustment condition setting unit registers the adjustment condition template that can be repeatedly used for adjustment of time/dates of different assemblies and the access information corresponding to the adjustment condition template, based on designation of the adjustment initiator on the template creation screen.

11. The time/date adjustment apparatus according to claim 10, wherein
the adjustment condition setting unit causes the first terminal apparatus to display a template list screen for selecting the adjustment condition template created in advance, and displays the access information corresponding to the selected adjustment condition template for the adjustment initiator, based on selection of the adjustment initiator on the template list screen.

12. A time/date adjustment method performed by a time/date adjustment apparatus, the time/date adjustment method comprising:
an authentication step of performing authentication processing with an external system managing schedule information of a belonging member belonging to an organization being a member of the time/date adjustment apparatus;
an adjustment condition setting step of setting an adjustment condition related to an assembly; and
a time/date adjustment step of adjusting an assembly time/date based on the adjustment condition, wherein
the authentication step includes performing first authentication processing with the external system, by using an administrator privilege account of the external system,
after the first authentication processing succeeds, the authentication step includes acquiring belonging member information managed by the external system from the external system by using the administrator privilege account, the belonging member information including information that is not allowed to be acquired using an account not having an administrator privilege of the external system,
the adjustment condition setting step includes setting the adjustment condition including a participant in the assembly selected out of a belonging member list based on the belonging member information, based on an input of an adjustment initiator being the belonging member of the organization and a user of the time/date adjustment apparatus,
when an adjustment partner performs access based on access information, the time/date adjustment step includes referring to the schedule information of the participant managed by the external system, and extracting candidate time/dates that are available time/dates of the participant satisfying the adjustment condition,
the time/date adjustment step includes causing a second terminal apparatus used by the adjustment partner to display a time/date adjustment screen presenting the extracted candidate time/dates, and determining the assembly time/date out of the extracted candidate time/dates, based on a selection operation of the adjustment partner on the time/date adjustment screen, and
the time/date adjustment step includes registering the determined assembly time/date in the schedule information of the participant managed by the external system.

13. A non-transitory computer-readable storage medium storing a program causing a computer to function as a time/date adjustment apparatus, the program causing the computer to function as:
an authentication unit configured to perform authentication processing with an external system managing schedule information of a belonging member belonging to an organization being a member of the time/date adjustment apparatus;
an adjustment condition setting unit configured to set an adjustment condition related to an assembly; and
a time/date adjustment unit configured to adjust an assembly time/date based on the adjustment condition, wherein
the authentication unit performs first authentication processing with the external system, by using an administrator privilege account of the external system,
after the first authentication processing succeeds, the authentication unit acquires belonging member information managed by the external system from the external system by using the administrator privilege account, the belonging member information including information that is not allowed to be acquired using an account not having an administrator privilege of the external system,
the adjustment condition setting unit sets the adjustment condition including a participant in the assembly selected out of a belonging member list based on the belonging member information, based on an input of an adjustment initiator being the belonging member of the organization and a user of the time/date adjustment apparatus,
when an adjustment partner performs access based on access information, the time/date adjustment unit refers to the schedule information of the participant managed by the external system, and extracts candidate time/dates that are available time/dates of the participant satisfying the adjustment condition,
the time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen, and
the time/date adjustment unit registers the determined assembly time/date in the schedule information of the participant managed by the external system.

14. A time/date adjustment method performed by a time/date adjustment apparatus, the time/date adjustment method comprising:
an authentication step of performing authentication processing with an external system managing schedule information of a site to be used for an assembly by a belonging member belonging to an organization being a member of the time/date adjustment apparatus;
an adjustment condition setting step of setting an adjustment condition related to the assembly; and
a time/date adjustment step of adjusting an assembly time/date based on the adjustment condition, wherein
the authentication step includes performing first authentication processing with the external system, by using an administrator privilege account of the external system, after the first authentication processing succeeds, the authentication step includes acquiring site information managed by the external system from the external system by using the administrator privilege account, the site information including information that is not allowed to be acquired using an account not having an administrator privilege of the external system,
the adjustment condition setting step includes setting the adjustment condition including a selected site selected out of a site list based on the site information, based on an input of an adjustment initiator being the belonging member of the organization and a user of the time/date adjustment apparatus, when an adjustment partner performs access based on access information, the time/date adjustment step includes referring to the schedule information of the selected site managed by the external system, and extracting candidate time/dates that are available time/dates of the selected site satisfying the adjustment condition, the time/date adjustment step includes causing a second terminal apparatus used by the adjustment partner to display a time/date adjustment screen presenting the extracted candidate time/dates, and determining the assembly time/date out of the extracted candidate time/dates, based on a selection operation of the adjustment partner on the time/date adjustment screen, and the time/date adjustment step includes registering the determined assembly time/date in the schedule information of the selected site managed by the external system.

15. A non-transitory computer-readable storage medium storing a program causing a computer to function as a time/date adjustment apparatus, the program causing the computer to function as:

an authentication unit configured to perform authentication processing with an external system managing schedule information of a site to be used for an assembly by a belonging member belonging to an organization being a member of the time/date adjustment apparatus;

an adjustment condition setting unit configured to set an adjustment condition related to the assembly; and a time/date adjustment unit configured to adjust an assembly time/date based on the adjustment condition, wherein the authentication unit performs first authentication processing with the external system, by using an administrator privilege account of the external system, after the first authentication processing succeeds, the authentication unit acquires site information managed by the external system from the external system by using the administrator privilege account, the site information including information that is not allowed to be acquired using an account not having an administrator privilege of the external system, the adjustment condition setting unit sets the adjustment condition including a selected site selected out of a site list based on the site information, based on an input of an adjustment initiator being the belonging member of the organization and a user of the time/date adjustment apparatus, when an adjustment partner performs access based on access information, the time/date adjustment unit refers to the schedule information of the selected site managed by the external system, and extracts candidate time/dates that are available time/dates of the selected site satisfying the adjustment condition, the time/date adjustment unit causes a second terminal apparatus used by the adjustment partner to display a time/date adjustment screen presenting the extracted candidate time/dates, and determines the assembly time/date out of the extracted candidate time/dates, based on a selection operation of the adjustment partner on the time/date adjustment screen, and the time/date adjustment unit registers the determined assembly time/date in the schedule information of the selected site managed by the external system.

* * * * *